(12) United States Patent
Tanaka et al.

(10) Patent No.: US 6,608,739 B1
(45) Date of Patent: Aug. 19, 2003

(54) SPIN VALVE THIN FILM MAGNETIC ELEMENT HAVING FIRST AND SECOND FREE MAGNETIC LAYERS HAVING ANTIPARALLEL MAGNETIZATION DIRECTIONS

(75) Inventors: Kenichi Tanaka, Niigata-ken (JP); Masamichi Saito, Niigata-ken (JP); Yosuke Ide, Niigata-ken (JP); Naoya Hasegawa, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 33 days.

(21) Appl. No.: 09/677,807

(22) Filed: Oct. 3, 2000

(30) Foreign Application Priority Data

Oct. 14, 1999 (JP) .......................... 11-292966

(51) Int. Cl.$^7$ ............................... G11B 5/39
(52) U.S. Cl. ...................... 360/324.12; 360/324.11
(58) Field of Search ................ 360/324.1, 324.11, 360/324.12, 324.2

(56) References Cited

U.S. PATENT DOCUMENTS

| | | | | |
|---|---|---|---|---|
| 5,408,377 A | | 4/1995 | Gurney et al. ............ 338/32 R |
| 6,090,480 A | * | 7/2000 | Hayashi ...................... 428/332 |
| 6,153,320 A | * | 11/2000 | Parkin ......................... 428/693 |
| 6,166,948 A | * | 12/2000 | Parkin et al. ................ 365/173 |
| 6,181,533 B1 | * | 1/2001 | Pokhil .......................... 360/324 |
| 6,201,673 B1 | * | 3/2001 | Rottmayer et al. ..... 360/324.12 |
| 6,221,172 B1 | | 4/2001 | Saito et al. ................... 148/108 |
| 6,271,997 B1 | * | 8/2001 | Gill .............................. 360/314 |
| 6,275,363 B1 | * | 8/2001 | Gill ............................ 360/324.2 |
| 6,351,355 B1 | * | 2/2002 | Min et al. ............... 360/324.11 |
| 6,385,017 B1 | * | 5/2002 | Min et al. ............... 360/324.12 |
| 6,392,853 B1 | * | 5/2002 | Li et al. ................. 360/324.12 |

FOREIGN PATENT DOCUMENTS

| | | |
|---|---|---|
| JP | 3040750 | 7/1998 |
| JP | 3040751 | 2/2000 |
| JP | 3088382 | 2/2000 |
| JP | 3040750 | 3/2000 |

OTHER PUBLICATIONS

1996 Digests of Intermag '96, 1996 IEEE International Magnetics Conference, AA-04.

* cited by examiner

*Primary Examiner*—Jefferson Evans
(74) *Attorney, Agent, or Firm*—Brinks Hofer Gilson & Lione

(57) ABSTRACT

The present invention provides a spin valve thin film magnetic element in which the sensitivity and the rate of change in resistance can be increased while stably maintaining the ferrimagnetic state of a free magnetic layer. The spin valve thin film magnetic element includes an antiferromagnetic layer, a pinned magnetic layer in which the magnetization direction thereof is pinned by an exchange coupling magnetic field with the antiferromagnetic layer, a nonmagnetic conductive layer in contact with the pinned magnetic layer, and a free magnetic layer in contact with the nonmagnetic conductive layer. The free magnetic layer includes a nonmagnetic intermediate layer, and first and second free magnetic layers with the nonmagnetic intermediate layer provided therebetween, the thickness of the second free magnetic layer provided on the nonmagnetic conductive layer side being larger than that of the first free magnetic layer. Therefore, the rate of change in resistance of the spin valve thin film magnetic element can be increased, and the spin flopping field of the free magnetic layer can be increased.

1 Claim, 19 Drawing Sheets

SPIN VALVE THIN FILM MAGNETIC ELEMENT HAVING FIRST AND SECOND FREE MAGNETIC LAYERS HAVING ANTIPARALLEL MAGNETIZATION DIRECTIONS

BACKGROUND OF THE INVENTION

1. Field of the Invention

The present invention relates to a spin valve thin film magnetic element, a thin film magnetic head, and a method of manufacturing the spin valve thin film magnetic element. Particularly, the present invention relates to a spin valve thin film magnetic element comprising a synthetic ferrimagnetic free layer comprising two magnetic layers with a nonmagnetic intermediate layer provided therebetween.

2. Description of the Related Art

Magnetoresistive magnetic heads include a MR (Magnetoresistive) head comprising an element exhibiting a magnetoresistive effect, and a GMR (Giant Magnetoresistive) head comprising an element exhibiting a giant magnetoresistive effect. In the MR head, the element exhibiting the magnetoresistive effect has a single layer structure comprising a magnetic material. On the other hand, in the GMR head, the element exhibiting the magnetoresistive effect has a multilayer structure in which a plurality of materials are laminated. Of several types of structures creating the giant magnetoresistive effect, a relatively simple structure exhibiting a high rate of change in resistance with an external magnetic field is a spin valve thin film magnetic element.

Recently, high-density magnetic recording has been increasingly required, and a spin valve thin film magnetic element adaptable to high density recording has increasingly attracted attention.

A conventional spin valve thin film magnetic element is described with reference to the drawings. FIG. 19 is a schematic sectional view showing a conventional spin valve thin film magnetic element 101, as viewed from the magnetic recording medium side, and FIG. 20 is a schematic sectional view of the spin valve thin film magnetic element 101, as viewed from the track width direction.

A reproducing thin film magnetic head comprises the spin valve thin film magnetic element 101, and shield layers formed above and below the spin valve thin film magnetic element 101 with gap layers provided therebetween. In addition, a recording inductive head may be laminated on the reproducing thin film magnetic head.

The thin film magnetic head is provided at the trailing side end of a floating slider together with the inductive head to form a thin film magnetic head for detecting a recording magnetic field of a magnetic recording medium such as a hard disk, or the like.

In FIGS. 19 and 20, the Z direction coincides with the movement direction of the magnetic recording medium, the Y direction coincides with the direction of a leakage magnetic field from the magnetic recording medium, and the $X_1$ direction coincides with the track width direction of the spin valve thin film magnetic element.

The spin valve thin film magnetic element 101 shown in FIGS. 19 and 20 is a bottom-type single spin valve thin film magnetic element in which an antiferromagnetic layer 103, a pinned magnetic layer 104, a nonmagnetic conductive layer 105, and a free magnetic layer 111 are laminated in turn.

In FIGS. 19 and 20, reference numeral 100 denotes an insulating layer made of $Al_2O_3$ or the like, and reference numeral 102 denotes a base layer made of Ta (tantalum) or the like, and laminated on the insulating layer 100. The antiferromagnetic layer 103 is laminated on the base layer 102, the pinned magnetic layer 104 is laminated on the antiferromagnetic layer 103, and the nonmagnetic conductive layer 105 made of Cu is laminated on the pinned magnetic layer 104. Furthermore, the free magnetic layer 111 is laminated on the nonmagnetic conductive layer 105, and a protecting layer 120 made of Ta or the like is laminated on the free magnetic layer 111.

The layers from the base layer 120 to the protecting layer 120 are laminated in turn to form a lamination 121 having a substantially trapezoidal sectional shape having a width corresponding to the track width.

The pinned magnetic layer 104 is made of, for example, Co, and laminated in contact with the antiferromagnetic layer 103. An exchange coupling magnetic field (exchange anisotropic magnetic field) occurs in the interface between the pinned magnetic layer 104 and the antiferromagnetic layer 103 so that the magnetization direction of the pinned magnetic layer 104 is pinned in the Y direction.

The free magnetic layer 111 comprises first and second free magnetic layers 110 and 108 with a nonmagnetic intermediate layer 109 provided therebetween. The first free magnetic layer 110 is provided on the protecting layer side of the nonmagnetic intermediate layer 109, and the second free magnetic layer 108 is provided on the nonmagnetic conductive layer side of the nonmagnetic intermediate layer 109.

The thickness $t_1$ of the first free magnetic layer 110 is larger than the thickness $t_2$ of the second free magnetic layer 108.

The first free magnetic layer 110 is made of a ferromagnetic material such as a NiFe alloy or the like, and the nonmagnetic intermediate layer 109 is made of a nonmagnetic material such as Ru or the like.

The second free magnetic layer 108 comprises an anti-diffusion layer 106, and a ferromagnetic layer 107, both of which are made of a ferromagnetic material. For example, the anti-diffusion layer 106 is made of Co, and the ferromagnetic layer 107 is made of a NiFe alloy. The first free magnetic layer 110 and the ferromagnetic layer 107 are preferably made of the same material.

The anti-diffusion layer 106 is provided for preventing mutual diffusion between the ferromagnetic layer 107 and the nonmagnetic conductive layer 105 to increase the GMR effect ($\Delta$MR) produced in the interface with the nonmagnetic conductive layer 105.

Assuming that saturation magnetizations of the first and second free magnetic layers 110 and 108 are $M_1$ and $M_2$, respectively, the magnetic thicknesses of the first and second free magnetic layers 110 and 108 are $M_1 \cdot t_1$ and $M_2 \cdot t_2$, respectively.

Since the second free magnetic layer 108 comprises the anti-diffusion layer 106 and the ferromagnetic layer 107., the magnetic thickness $M_2 \cdot t_2$ of the second free magnetic layer 108 is the sum of the magnetic thickness of the anti-diffusion layer 106, and the magnetic thickness of the ferromagnetic layer 107.

The free magnetic layer 111 is formed to satisfy the relation $M_1 \cdot t_1 > M_2 \cdot t_2$ between the magnetic thicknesses of the first and second free magnetic layers 110 and 108.

Actually, the saturation magnetization of Co which constitutes the anti-diffusion layer 106 is higher than that of the NiFe alloy which constitutes the ferromagnetic layer 107 and the first free magnetic layer 110, and thus the thickness $t_1$ of the first free magnetic layer 110 is set to be extremely larger than the thickness $t_2$ of the second free magnetic layer 108 in order to establish the relation $M_1 \cdot t_1 > M_2 \cdot t_2$.

The first and second free magnetic layers 110 and 108 are antiferromagnetically coupled with each other. Namely, when the magnetization direction of the first free magnetic layer 110 is oriented in the $X_1$ direction shown in the drawings by bias layers 132, the magnetization direction of the second free magnetic layer 108 is oriented in the direction opposite to the $X_1$ direction.

Since the magnetic thicknesses of the first and second free magnetic layers 110 and 108 have the relation $M_1 \cdot t_1 > M_2 \cdot t_2$, magnetization of the first free magnetic layer 110 remains so that the magnetization direction of the entire free magnetic layer 111 is oriented in the $X_1$ direction. At this time, the magnetic effective thickness of the free magnetic layer 111 is $(M_1 \cdot t_1 - M_2 \cdot t_2)$.

In this way, the first and second free magnetic layers 110 and 108 are antiferromagnetically coupled with each other so that the magnetization directions thereof are antiparallel to each other, and the magnetic thicknesses thereof have the relation $M_1 \cdot t_1 > M_2 \cdot t_2$. Therefore, the first and second free magnetic layers 110 and 108 are brought into a synthetic ferrimagnetic state.

As a result, the magnetization direction of the free magnetic layer 111 crosses the magnetization direction of the pinned magnetic layer 104.

Furthermore, the bias layers 132 made of, for example, a Co—Pt (cobalt-platinum) alloy, are formed on both sides of the lamination 121. The bias layers 132 are formed for orienting the magnetization direction of the free magnetic layer 111 in the $X_1$ direction to put the free magnetic layer 111 in a single magnetic domain state, suppressing Barkhausen noise of the free magnetic layer 111.

In FIGS. 19 and 20, reference numeral 134 denotes a conductive layer made of Cu, or the like.

Furthermore, bias base layers 131 made of a nonmagnetic material, for example, such as Cr, are provided between the bias layers 132 and the insulating layer 100, and between the bias layers 132 and the lamination 121.

Furthermore, intermediate layers 133 made of a nonmagnetic material, for example, Ta or Cr, are provided between the bias layers 132 and the conductive layers 134.

In the spin valve thin film magnetic element 101, when the magnetization direction of the free magnetic layer 111, which is oriented in the $X_1$ direction, is changed by a leakage magnetic field from the recording medium such as a hard disk, the electric resistance changes with the relation to magnetization of the pinned magnetic layer 104 which is pinned in the Y direction so that the leakage magnetic field from the recording medium is detected by a voltage change based on the change in electric resistance.

Since the free magnetic layer 111 comprises the first and second free magnetic layers 110 and 108 which are antiferromagnetically coupled with each other, the magnetization direction of the whole free magnetic layer 111 is changed with an external magnetic field of small magnitude, thereby increasing the sensitivity of the spin valve thin film magnetic element 101.

Particularly, the magnetic effective thickness of the free magnetic layer is $(M_1 \cdot t_1 - M_2 \cdot t_2)$, and thus the effective thickness can be decreased by controlling the thicknesses of the first and second free magnetic layers 110 and 108.

Therefore, the magnetization direction of the free magnetic layer 111 is easily changed with an external magnetic field of small magnitude, thereby increasing the sensitivity of the spin valve thin film magnetic element 101.

In the conventional spin valve thin film magnetic element 101, the thickness $t_1$ of the first free magnetic layer 110 is set to be extremely larger than the thickness $t_2$ of the second free magnetic layer 108 in order to establish the relation $M_1 \cdot t_1 > M_2 \cdot t_2$.

However, the thickness of the entire free magnetic layer 111 increases as the thickness tl of the first free magnetic layer 110 increases to increase a shunt (a so-called shunt loss) of a sensing current, thereby causing a problem in which the rate of change in resistance of the spin valve thin film magnetic element 101 cannot be sufficiently increased.

Also, the sensitivity of the spin valve thin film magnetic element is increased by decreasing the effective thickness $(M_1 \cdot t_1 - M_2 \cdot t_2)$ of the free magnetic layer 111. However, when ΔMR is increased by decreasing the effective thickness while maintaining the relation $M_1 \cdot t_1 > M_2 \cdot t_2$, a magnetic field with which spin flopping transition occurs in the free magnetic layer 111, i.e., a spin flopping field, is decreased.

The spin flopping field represents the magnitude of an external magnetic field when the magnetization directions of two magnetic layers are not antiparallel to each other with an external magnetic field applied.

Namely, a decrease in the spin flopping field of the free magnetic layer 111 causes the antiferromagnetic coupling between the first and second free magnetic layers 110 and 108 to be easily broken by the bias magnetic fields from the bias layers 132, and thus the magnetization directions of the first and second free magnetic layers 110 and 108 are not oriented in antiparallel directions. Therefore, the ferrimagnetic state of the free magnetic layer 111 cannot be maintained to possibly cause a decrease in the rate of change in resistance (decrease in reproduced output), and asymmetry of reproduced waveform.

SUMMARY OF THE INVENTION

The present invention has been achieved in consideration of the above situation, and an object of the present invention is to provide a spin valve thin film magnetic element and a manufacturing method therefor, which are capable of increasing sensitivity and the rate of change in resistance while stably maintaining the ferrimagnetic state of a free magnetic layer. Another object of the present invention is to provide a thin film magnetic head comprising the spin valve thin film magnetic element and producing high reproduced output.

In order to achieve the objects, the present invention has the following construction.

A spin valve thin film magnetic element of the present invention comprises an antiferromagnetic layer, a pinned magnetic layer formed in contact with the antiferromagnetic layer so that the magnetization direction is pinned by an exchange coupling magnetic field with the antiferromagnetic layer, a nonmagnetic conductive layer in contact with the pinned magnetic layer, and a free magnetic layer in contact with the nonmagnetic conductive layer, wherein the antiferromagnetic layer comprises any one of alloys represented by the formula X—Mn (wherein X represents one element selected from Pt, Pd. Ru, Ir, Rh, and Os), and alloys represented by the formula X'—Mn (wherein X' represents at least one element selected from Pt, Pd, Cr, Ni, Ru, Ir, Rh, Os, Au, and Ag), and the free magnetic layer comprises first and second free magnetic layers with a nonmagnetic intermediate layer provided therebetween, wherein the magnetization directions of the first and second free magnetic layers are antiparallel to each other, the first and second free magnetic layers are brought into a ferrimagnetic state, and the thickness of the second free magnetic layer provided on the nonmagnetic conductive layer side is larger than the thickness of the first free magnetic layer.

In the spin valve thin film magnetic element, of the two magnetic layers which constitute the free magnetic layer, the second magnetic layer provided on the nonmagnetic conductive layer side is thicker than the first free magnetic layer so that the magnetic thickness of the second free magnetic layer is larger than that of the first free magnetic layer.

Therefore, the spin flopping field of the free magnetic layer is increased, and thus the antiferromagnetic coupling between the first and second free magnetic layers can be stably maintained to maintain the ferrimagnetic state of the free magnetic layer, thereby increasing the sensitivity of the spin valve thin film magnetic element.

The spin flopping field is preferably higher than the bias magnetic fields from the bias layers.

Since the first and second free magnetic layers are antiferromagnetically coupled with each other to be put into the ferrimagnetic state, a difference between the magnetic thicknesses of both magnetic layers corresponds to the magnetic effective thickness of the free magnetic layer.

Therefore, the effective thickness of the free magnetic layer is decreased by appropriately controlling the thicknesses of the first and second free magnetic layers so that the magnetization direction of the free magnetic layer can be changed with an external magnetic field of small magnitude, thereby increasing the sensitivity of the spin valve thin film magnetic element.

In addition, the magnetic effective thickness of the free magnetic layer can be decreased while the thickness of the entire free magnetic layer is increased to some extent, thereby increasing the sensitivity of the spin valve thin, film magnetic element without significantly decreasing the rate of change in resistance.

In another aspect of the present invention, a spin valve thin film magnetic element comprises an antiferromagnetic layer, a pinned magnetic layer formed in contact with the antiferromagnetic layer so that the magnetization direction is pinned by an exchange coupling magnetic field with the antiferromagnetic layer, a nonmagnetic conductive layer in contact with the pinned magnetic layer, and a free magnetic layer in contact with the nonmagnetic conductive layer, wherein the antiferromagnetic layer comprises any one of alloys represented by the formula X—Mn (wherein X represents one element selected from Pt, Pd, Ru, Ir, Rh, and Os), and alloys represented by the formula X'—Mn (wherein X' represents at least one element selected from Pt, Pd, Cr, Ni, Ru, Ir, Rh, Os, Au, and Ag), and the free magnetic layer comprises first and second free magnetic layers with a nonmagnetic intermediate layer provided therebetween, wherein the magnetization directions of the first and second free magnetic layer are antiparallel to each other, the first and second free magnetic layers are brought into a ferrimagnetic state, and assuming that saturation magnetization and the thickness of the second free magnetic layer provided on the nonmagnetic conductive layer side are $M_2$ and $t_2$, respectively, and saturation magnetization and the thickness of the first free magnetic layer are $M_1$ and $t_1$, respectively, $M_2 \cdot t_2 > M_1 \cdot t_1$ is satisfied.

In the spin valve thin film magnetic element, assuming that saturation magnetization and the thickness of the second free magnetic layer of the two magnetic layers, which constitute the free magnetic layer, are $M_2$ and $t_2$, respectively, and saturation magnetization and the thickness of the first free magnetic layer are $M_1$ and $t_1$, respectively, the magnetic thicknesses of the second and first free magnetic layers are represented by $M_2 \cdot t_2$ and $M_1 \cdot t_1$, respectively.

Since the free magnetic layer of the spin valve thin film magnetic element is formed to satisfy the relation $M_2 \cdot t_2 > M_1 \cdot t_1$, the magnetic thickness of the second free magnetic layer is larger than that of the first free magnetic layer.

Therefore, the spin flopping field of the free magnetic layer is increased to stably maintain the antiferromagnetic coupling between the first and second free magnetic layers, thereby increasing the rate of change in resistance while maintaining the ferrimagnetic state of the free magnetic layer. Thus, the sensitivity of the spin valve thin film magnetic element can be increased.

Furthermore, the first and second free magnetic layers are antiferromagnetically coupled with each other to be put into the ferrimagnetic state, the magnetic effective thickness of the free magnetic layer is represented by $(M_2 \cdot t_2 - M_1 \cdot t_1)$.

Therefore, the effective thickness of the free magnetic layer can be decreased by appropriately controlling the magnetic thicknesses of the two magnetic layers to increase the rate of change in resistance, increasing the sensitivity of the spin valve thin film magnetic element.

Particularly, when the second free magnetic layer comprises a ferromagnetic layer and an anti-diffusion layer in order to prevent mutual diffusion between the magnetic layer on the nonmagnetic conductive layer side and the nonmagnetic conductive layer, the magnetic thickness $M_2 \cdot t_2$ of the second free magnetic layer is represented by the sum of the magnetic thicknesses of the anti-diffusion layer and the ferromagnetic layer.

Therefore, the difference $(M_2 \cdot t_2 \cdot M_1 \cdot t_1)$ can be decreased by appropriately controlling the saturation magnetization and the thickness of each of the anti-diffusion layer, the ferromagnetic layer, and the other magnetic layer so that the magnetization direction of the free magnetic layer can be changed with an external magnetic field of small magnitude, further increasing the sensitivity of the spin valve thin film magnetic element.

Furthermore, the thickness of the free magnetic layer can be decreased by appropriately controlling the saturation magnetization and the thickness of each of the anti-diffusion layer, the ferromagnetic layer, and the first free magnetic layer to decrease a shunt (a so-called shunt loss) of a sensing current in the free magnetic layer, and increase the rate of change in resistance.

In the above-described spin valve thin film magnetic element of the present invention, the thickness of the second free magnetic layer lies in the range of 25 to 45 Å.

In the spin valve thin film magnetic element, the thickness of the second free magnetic layer provided on the nonmagnetic conductive layer side lies in the range of 25 to 45 Å, and thus the rate of change in resistance of the spin valve thin film magnetic element can be increased.

In the spin valve thin film magnetic element of the present invention, the pinned magnetic layer may comprise first and second pinned magnetic layers with a nonmagnetic layer provided therebetween, wherein the magnetization directions of the first and second pinned magnetic layers are antiparallel to each other, and the first and second pinned magnetic layers are put into a ferrimagneic state.

In this spin valve thin film magnetic element, the magnetization directions of the first and second pinned magnetic layers are antiparallel to each other, and the first and second pinned magnetic layers are put into the ferrimagneic state, thereby leaving slight spontaneous magnetization of the whole pinned magnetic layer. Therefore, the spontaneous magnetization can be further amplified by an exchange coupling magnetic field with the antiferromagnetic layer to strongly pin the magnetization direction of the pinned magnetic layer.

A thin film magnetic head of the present invention comprises the above-described spin valve thin film magnetic element.

The thin film magnetic head comprises the spin valve thin film magnetic element exhibiting the high rate of change in resistance and high sensitivity, and can thus detect an external magnetic field of small magnitude, increasing the reproduced output of the head. Therefore, the thin film magnetic head can be used as a magnetic recording device with a high recording density.

A method of manufacturing a spin valve thin film magnetic element of the present invention comprises the lamination step of laminating an antiferromagnetic layer, a pinned magnetic layer, a nonmagnetic conductive layer, and a free magnetic layer comprising first and second free magnetic layers antiferromagnetically coupled with each other with a nonmagnetic intermediate layer provided therebetween to form a lamination, the first heat treatment step of heat-treating the lamination with a magnetic field applied in the direction perpendicular to the track width direction of the lamination to produce an exchange coupling magnetic field between the antiferromagnetic layer and the pinned magnetic layer so that the magnetization direction of the pinned magnetic layer is pinned in the direction perpendicular to the track width direction, and the second heat treatment step of heat-treating the lamination with a magnetic field applied in the track width direction, which is higher than the coercive force of the free magnetic layer and lower than the magnetic field of spin flopping transition of the first and second free magnetic layers antiferromagnetically coupled with each other, to orient the direction of induced magnetic anisotropy of the first and second free magnetic layers in the track width direction, wherein the thickness of the second free magnetic layer provided on the nonmagnetic conductive layer side is larger than that of the first free magnetic layer.

In the present invention, the free magnetic layer comprises the first and second free magnetic layers antiferromagnetically coupled with each other, and the coercive force of the free magnetic layer means a magnetic field with which synthetic magnetization $(M_2 \cdot t_2 - M_1 \cdot t_1)$ is oriented in the direction of the applied magnetic field with the magnetization directions of the first and second free magnetic layers maintained in an antiparallel state.

In this method of manufacturing a spin valve thin film magnetic element of the present invention, the thickness of the second free magnetic layers of the two magnetic layers, which constitute the free magnetic layer, is larger than that of the first free magnetic layer, and the lamination is heat-treated with a magnetic field applied in the track width direction, which is higher than the coercive force of the free magnetic layer and lower than the magnetic field of spin flopping transition of the first and second free magnetic layers, to orient the direction of induced magnetic anisotropy of the first and second free magnetic layers, which is disturbed by the first heat treatment step, in the track width direction. Therefore, the spin valve thin film magnetic element exhibiting less Barkhausen noise in the free magnetic layer, high sensitivity, and the high rate of change in resistance can be obtained.

Furthermore, the method of manufacturing the above-described spin valve thin film magnetic element of the present invention may further comprise the third heat treatment step of heat-treating the lamination at a temperature lower than the heat treatment temperature of the second heat treatment step with a rotating magnetic field applied, which is higher than the coercive force of the free magnetic layer and lower than the magnetic field of spin flopping transition of the first and second free magnetic layers, after the second heat treatment step.

In this method of manufacturing the spin valve thin film magnetic element, heat treatment with the rotating magnetic field applied can decrease the magnetic hysteresis of the free magnetic layer to further decrease Barkhausen noise of the free magnetic layer, thereby producing the spin valve thin film magnetic element having high sensitivity.

DESCRIPTION OF THE PREFERRED EMBODIMENTS

Embodiments of the present invention will be described below with reference to the drawings.

FIRST EMBODIMENT

Figure 1:
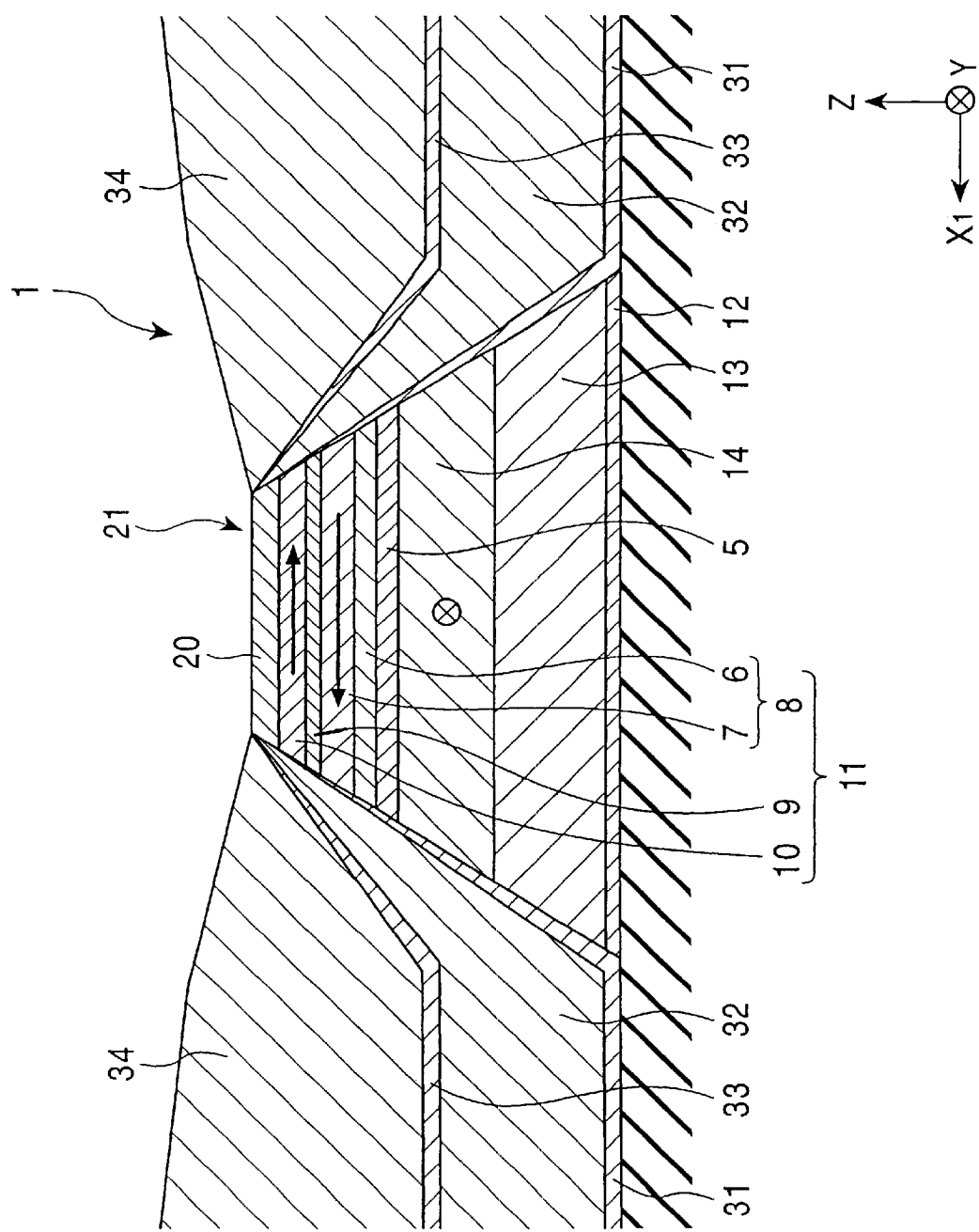
FIG. 1 is a schematic sectional view of a spin valve thin film magnetic element according to a first embodiment of the present invention, as viewed from the magnetic recording medium side.
Figure 2:
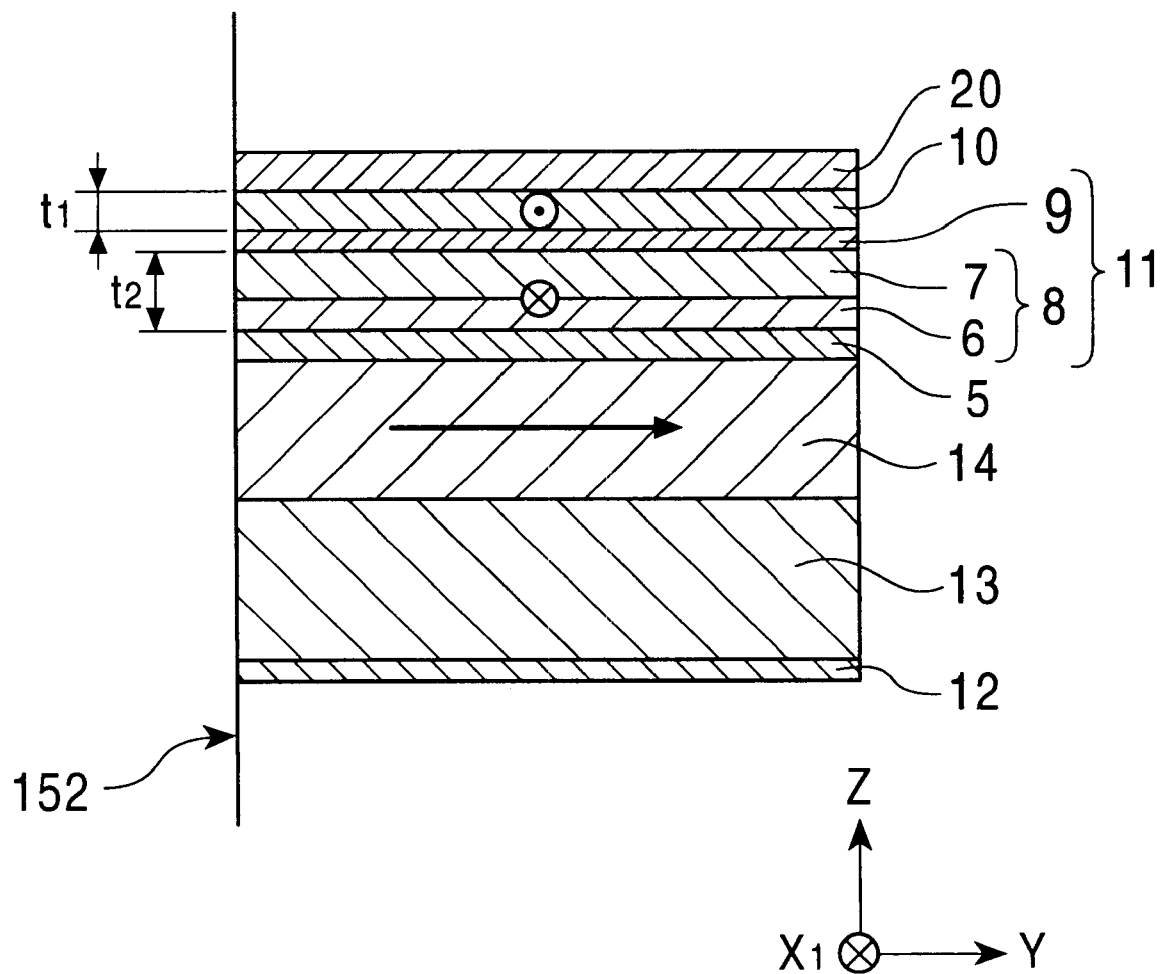
FIG. 2 is a schematic sectional view of the spin valve thin film magnetic element shown in FIG. 1, as viewed from the track width direction.

FIG. 1 is a schematic sectional view of a spin valve thin film magnetic element according to a first embodiment of the present invention, as viewed from the magnetic recording medium side, and FIG. 2 is a schematic sectional view of the spin valve thin film magnetic element, as viewed from the track width direction.

Figure 3:
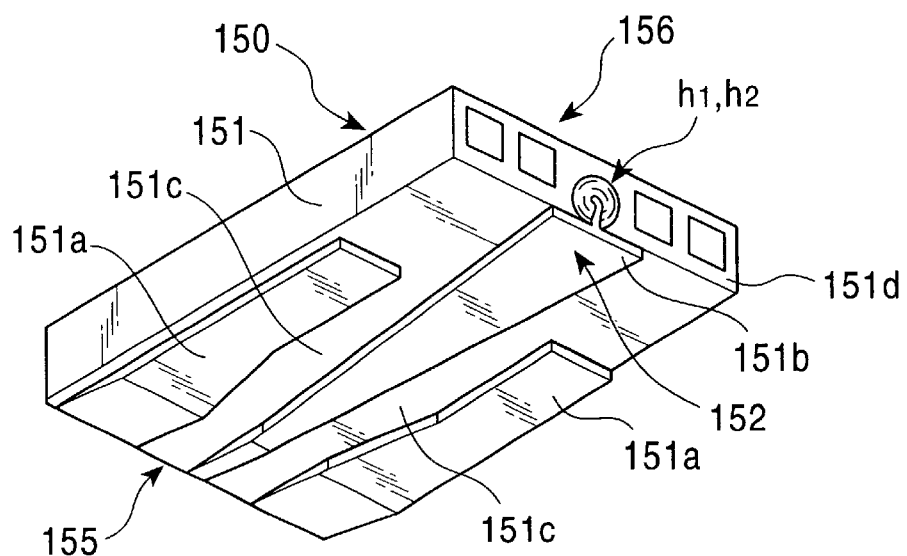
FIG. 3 is a perspective view of a floating magnetic head comprising a thin film magnetic head of the present invention.
Figure 4:
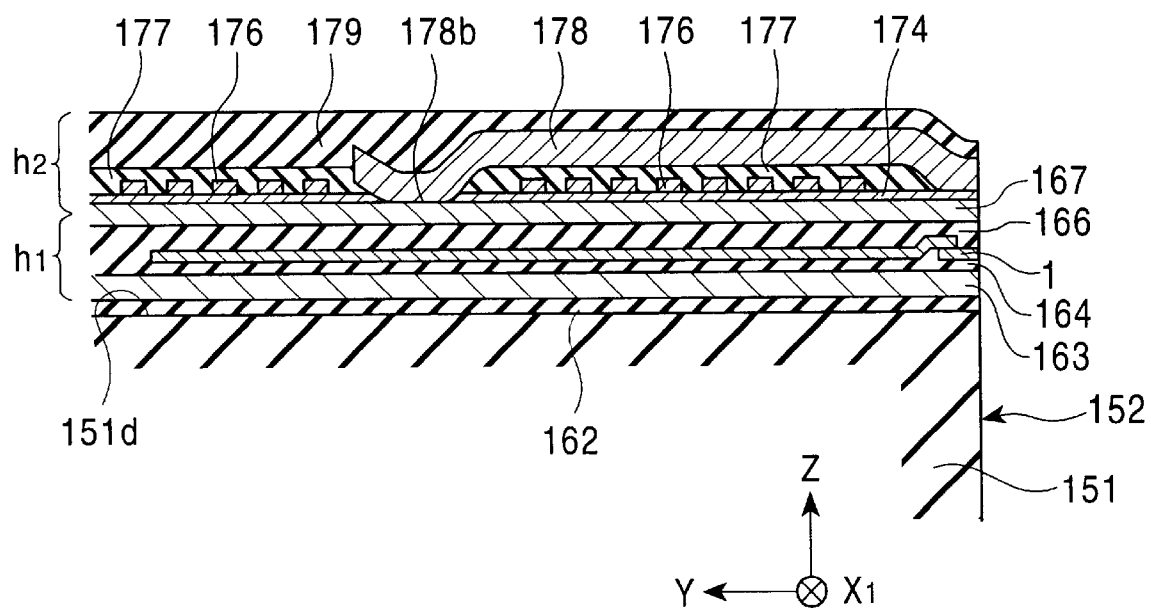
FIG. 4 is a schematic sectional view of a principal portion of the floating magnetic head shown in FIG. 3.

FIGS. 3 and 4 show a floating magnetic head comprising a thin film magnetic head comprising the spin valve thin film magnetic element of this embodiment.

The floating magnetic head 150 shown in FIG. 3 comprises a slider 151, a thin film magnetic head $h_1$ of the present invention, which is provided on the end surface 151d of the slider 151, and an inductive head $h_2$. In FIG. 3, reference numeral 155 denotes the leading side of the slider 151 on the upstream side in the movement direction of the magnetic recording medium, and reference numeral 156 denotes the trailing side. The slider 151 also comprises rails 151a and 151b formed on the medium-facing surface 152, and air grooves 151c provided between the rails.

As shown in FIGS. 3 and 4, the thin film magnetic head $h_1$ of the present invention comprises an insulating layer 162 formed on the end surface 151d of the slider 151, a lower shielding layer 163 laminated on the insulating layer 162, a lower gap layer 164 laminated on the lower shield layer 163, a spin valve thin film magnetic element 1 of the present invention formed on the lower gap layer 164 to be exposed in the medium-facing surface 152, an upper gap layer 166 formed to cover the spin valve thin film magnetic element 1, and an upper shield layer 167 formed to cover the upper gap layer 166.

The upper shield layer 167 is also used as the lower core layer of the inductive head $h_2$, which will be described below.

The inductive head $h_2$ comprises the lower core layer (upper shield layer) 167, a gap layer 174 laminated on the lower core layer 167, a coil 176, an upper insulating layer 177 formed to covet the coil 176, and an upper core layer 178 joined to the gap layer 174 and the lower core layer 167 on the coil 176 side.

The coil 176 is patterned in a spiral planar shape. Also, in the substantially central portion of the coil 176, the base end 178b of the upper core layer 178 is magnetically connected to the lower core layer 167.

Furthermore, a protecting layer 179 made of alumina or the like is laminated on the upper core layer 178.

In FIGS. 1, 2, and 4, the Z direction coincides with the movement direction of the magnetic recording medium, the Y direction coincides with the direction of a leakage magnetic field from the magnetic recording medium, and the $X_1$ direction coincides with the track width direction of the spin valve thin film magnetic element 1.

The spin valve thin film magnetic element 1 shown in FIGS. 1 and 2 is a bottom-type single spin valve thin film magnetic element in which an antiferromagnetic layer 13, a pinned magnetic layer 14, a nonmagnetic conductive layer 5, and a free magnetic layer 11 are laminated in turn.

In FIGS. 1 and 2, reference numeral 164 denotes the lower gap layer made of $Al_2O_3$ or the like, and reference numeral 12 denotes a base layer made of Ta (tantalum) or the like and laminated on the insulating layer 164. The antiferromagnetic layer 13 is laminated on the base layer 12, the pinned magnetic layer 14 is laminated on the antiferromagnetic layer 13, and the nonmagnetic conductive layer 5 made of Cu or the like is laminated on the pinned magnetic layer 14. Furthermore, the free magnetic layer 11 is laminated on the nonmagnetic conductive layer 5, and a protecting layer made of Ta is laminated on the free magnetic layer 11.

In this way, the layers from the base layer 12 to the protecting layer 20 are laminated in turn to form a lamination 21 having a substantially trapezoidal sectional shape having a width corresponding to the track width.

Furthermore, bias layers 32 made of, for example, a Co—Pt (cobalt-platinum) alloy, are formed on both sides of the lamination 21 in the $X_1$ direction, i.e., both sides in the track width direction. The bias layers 32 are provided for orienting the magnetization direction of the free magnetic layer 11 by a bias magnetic field, decreasing Barkhausen noise of the free magnetic layer 11.

Reference numeral 34 denotes a conductive layer made of Cr, Ta, Cu, Au, or the like. The conductive layers 34 are laminated on the bias layers 32, for applying a sensing current to the lamination 21.

Also, bias base layers 31 made of a nonmagnetic metal, for example, Cr are provided between the bias layers 32 and the lower gap layer 164, and between the bias layers 32 and the lamination 21.

Furthermore, intermediate layers 33 made of a nonmagnetic metal, for example, Ta or Cr are provided between the bias layers 32 and the conductive layers 34.

The antiferromagnetic layer 13 is preferably made of a PtMn alloy. The PtMn alloy has excellent corrosion resistance, and a high blocking temperature and a high exchange coupling magnetic field, as compared with a NiMn alloy and FeMn alloy conventionally used for antiferromagnetic layers.

Also, the antiferromagnetic layer 13 may be made of an alloy represented by the formula X—Mn (wherein X represents one element selected from Pt, Pd, Ru, Ir, Rh, and Os), or the formula X'—Mn (wherein X' represents at least one element selected from Pt, Pd, Cr, Ni, Ru, Ir, Rh, Os, Au, and Ag).

In an alloy represented by the formula X—Mn or X'—Mn, the content of Pt or X is preferably in the range of 37 to 63 atomic %, more preferably in the range of 44 to 57 atomic %.

In addition, in an alloy presented by the formula X'—Mn, the content of X' is preferably in the range of 37 to 63 atomic %, more preferably in the range of 44 to 57 atomic %.

An alloy in the above-described proper composition range used for the antiferromagnetic layer 13 is heat-treated in a magnetic field to obtain the antiferromagnetic layer 13 producing a high exchange coupling magnetic field. Particularly, the PtMn alloy permits the formation of the excellent antiferromagnetic layer 13 having an exchange coupling magnetic field of more than 800 (Oe), and a blocking temperature of as high as 380° C., at which the exchange coupling magnetic field is lost.

The pinned magnetic layer 14 is made of a ferromagnetic material, for example, a NiFe alloy, Co, a CoNiFe alloy, a CoFe alloy, a CoNi alloy, or the like, and preferably made of Co.

The pinned magnetic layer 14 is laminated in contact with the antiferromagnetic layer 13. Therefore, an exchange coupling magnetic field (an exchange anisotropic magnetic field) occurs in the interface between the pinned magnetic layer 14 and the antiferromagnetic layer 13 so that the magnetization direction of the pinned magnetic layer 14 is pinned in the Y direction.

The nonmagnetic conductive layer 5 is preferably made of a nonmagnetic material such as Cu, Cr, Au, Ag, or the like, more preferably Cu.

Referring to FIGS. 1 and 2, the free magnetic layer 11 comprises a nonmagnetic intermediate layer 9, and first and second free magnetic layers 10 and 8 with the nonmagnetic intermediate layer 9 provided therebetween. The first free magnetic layer 10 is provided on the protecting layer 20 side of the nonmagnetic intermediate layer 9, and the second free magnetic layer 8 is provided on the nonmagnetic conductive layer side of the nonmagnetic intermediate layer 9.

The first free magnetic layer 10 is made of a ferromagnetic material, for example, such as a NiFe alloy, Co, a CoNiFe alloy, a CoFe alloy, a CoNi alloy, or the like, more preferably made of a NiFe alloy.

The nonmagnetic intermediate layer 9 is preferably made of a nonmagnetic material, for example, one of Ru, Rh, Ir, Cr, Re, and Cu, or an alloy thereof, and more preferably made of Ru.

The second free magnetic layer 8 comprises an anti-diffusion layer 6 and a ferromagnetic layer 7.

The anti-diffusion layer 6 is made of a ferromagnetic material, for example, Co. The anti-diffusion layer 6 prevents mutual diffusion between the ferromagnetic layer 7 and the nonmagnetic conductive layer 5.

The ferromagnetic layer 7 is made of a ferromagnetic material, for example, a NiFe alloy, Co, a CoNiFe alloy, a CoFe alloy, a CoNi alloy, or the like, and preferably made of a NiFe alloy.

The second free magnetic layer 8 may comprise a single layer.

The thickness $t_2$ of the second free magnetic layer 8 is larger than the thickness $t_1$ of the first free magnetic layer 10.

The thickness $t_2$ of the second free magnetic layer 8 is preferably in the range of 25 to 45 Å. With the second free magnetic layer 8 having a thickness $t_2$ beyond the above range, the rate of change in resistance of the spin valve thin film magnetic element 1 cannot be increased.

The thickness $t_1$ of the first free magnetic layer 10 is preferably in the range of 5 to 25 Å.

Assuming that saturation magnetizations of the first and second free magnetic layers 10 and 8 are $M_1$ and $M_2$, respectively, the magnetic thicknesses of the first and second free magnetic layers 10 and 8 are $M_1 \cdot t_1$ and $M_2 \cdot t_2$, respectively.

Since the second free magnetic layer 8 comprises the anti-diffusion layer 6 and the ferromagnetic layer 7, the magnetic thickness $M_2 \cdot t_2$ of the second free magnetic layer 8 is the sum of the magnetic thickness $M_{21} \cdot t_{21}$ of the anti-diffusion layer 6 and the magnetic thickness $M_{22} \cdot t_{22}$ of the ferromagnetic layer 7.

Namely, the following equation is obtained:

$$M_2 \cdot t_2 = M_{21} \cdot t_{21} + M_{22} t_{22}$$

wherein $M_{21}$ and $t_{21}$ represent the saturation magnetization and thickness of the anti-diffusion layer 6, and $M_{22}$ and $t_{22}$ represent the saturation magnetization and thickness of the ferromagnetic layer 7.

For example, with the anti-diffusion layer 6 made of Co, and the ferromagnetic layer 7 made of a NiFe alloy, the saturation magnetization of the anti-diffusion layer 6 is higher than the saturation magnetization of the ferromagnetic layer 7.

The free magnetic layer 11 is formed to satisfy the relation $M_2 \cdot t_2 > M_1 \cdot t_1$ between the magnetic thicknesses of the first and second free magnetic layers 10 and 8.

Also, the first and second free magnetic layers 10 and 8 are antiferromagnetically coupled with each other. Namely, when the magnetization direction of the second free magnetic layer 8 is oriented in the $X_1$ direction by the bias layers 32, the magnetization direction of the first free magnetic layer 10 is oriented in the direction opposite to the $X_1$ direction.

Since the magnetic thicknesses of the first and second free magnetic layers 10 and 8 have the relation $M_2 \cdot t_2 > M_1 \cdot t_1$, magnetization of the second free magnetic layer 8 remains to orient the magnetization direction of the free magnetic layer 11 in the $X_1$ direction. At this time, the effective thickness of the free magnetic layer 11 is represented by $(M_2 \cdot t_2 - M_1 \cdot t_1)$.

In this way, the first and second free magnetic layers 10 and 8 are antiferromagnetically coupled with each other so that the magnetization directions thereof are antiparallel to each other, and the magnetic thicknesses thereof have the relation $M_2 \cdot t_2 > M_1 \cdot t_1$ to bring the first and second free magnetic layers 10 and 8 in a synthetic ferrimagnetic state.

Consequently, the magnetization direction of the free magnetic layer 11 crosses the magnetization direction of the pinned magnetic layer 4.

In the spin valve thin film magnetic element 1, when the magnetization direction of the free magnetic layer 11, which is oriented in the $X_1$ direction, is changed by a leakage magnetic field from a recording medium such as a hard disk or the like, the electric resistance changes with the relation to magnetization of the pinned magnetic layer 14, which is pinned in the Y direction, so that the leakage magnetic field from the recording medium is detected by a voltage change based on the change in the electric resistance value.

Since the magnetic thicknesses of the first and second free magnetic layer 10 and 8 have the relation $M_2 \cdot t_2 > M_1 \cdot t_1$, the spin flopping field of the free magnetic layer 11 can be increased.

The spin flopping field means the magnitude of an external magnetic field which is applied to two magnetic layers having antiparallel magnetization directions to cause a state in which the magnetization directions are not antiparallel to each other.

In an actual head, even when a longitudinal bias magnetic field exerts, the first and second free magnetic layers 10 and 8 are required to be maintained in the antiparallel state in an environment in which Joule heat is generated by a sensing current, or the environment of high temperature in a drive. If the antiparallel state is partially broken, a track profile is undesirably disturbed, resulting in a decrease in output.

Therefore, the spin flopping field and thermal stability of the spin flopping field are required.

Figure 21:
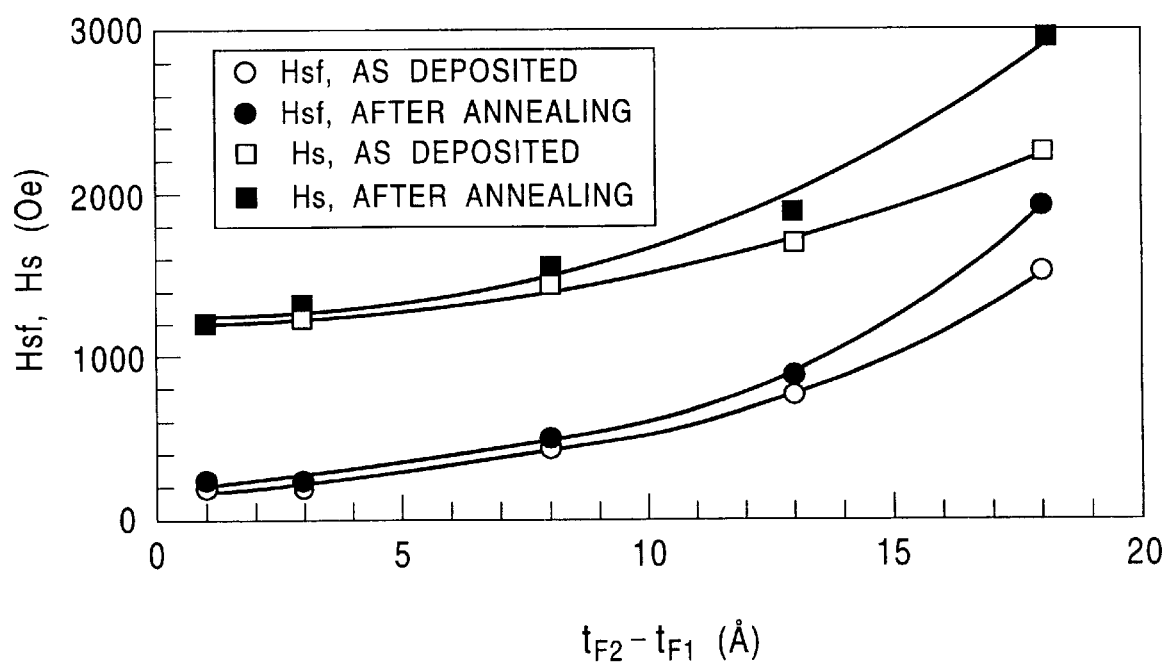
FIG. 21 is a graph showing the annealing effect on spin flopping field Hsf and saturation magnetization Hs with which first and second free magnetic layers are brought into a parallel state.

The spin flopping field is preferably sufficiently higher than an external magnetic field, for example, a bias magnetic field. As shown in FIG. 21, the spin flopping field can be increased by annealing, and it is thus found that like the PtMn alloy or an alloy represented by the formula X—Mn, the spin flopping field is compatible with an antiferromagnetic film required to be annealed for ordering.

Figure 5:
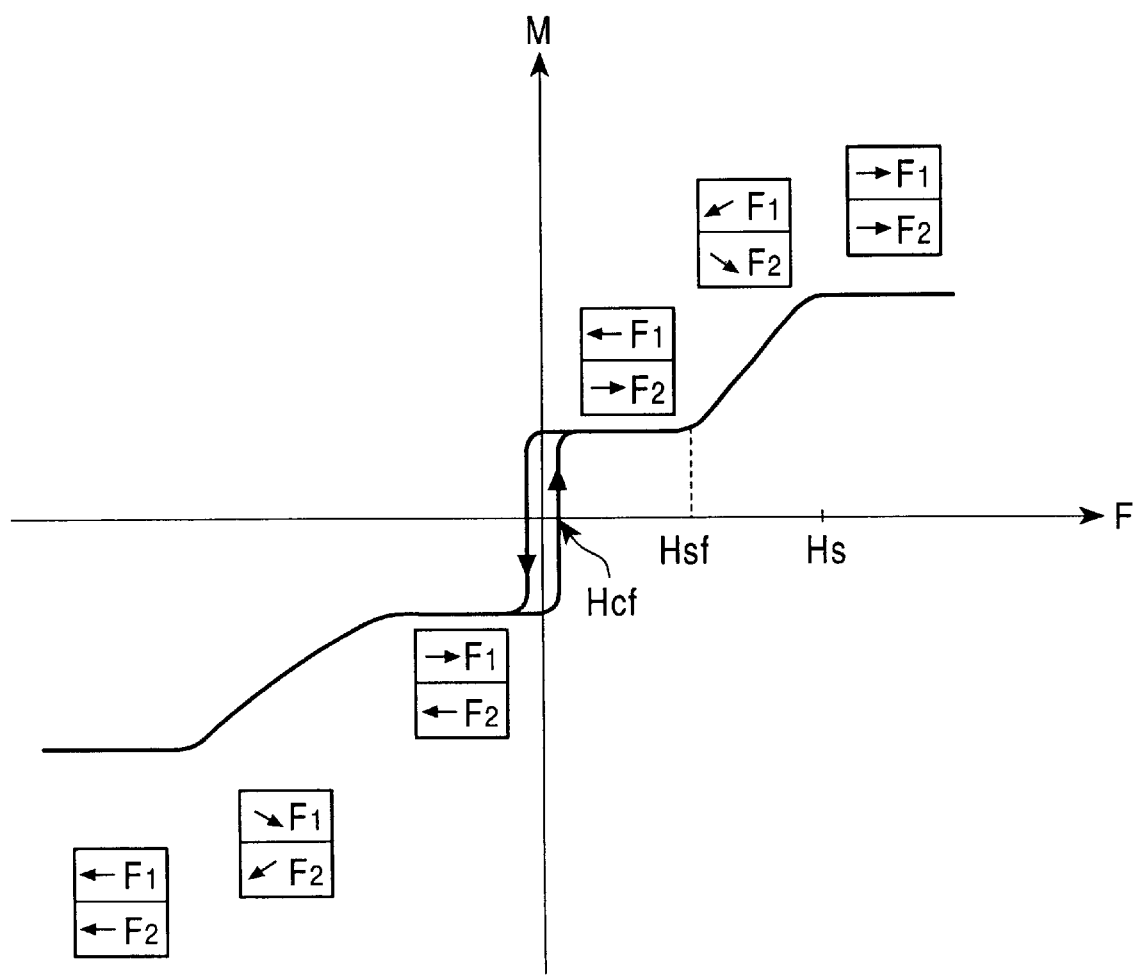
FIG. 5 is a graph showing the M-H curve of the free magnetic layer of the spin valve thin film magnetic element shown in FIG. 1.

FIG. 5 is a schematic diagram showing a N-H curve of the free magnetic layer 11. The M-H curve shows changes in magnetization M of the free magnetic layer 11 when an external magnetic field is applied to the free magnetic layer 11 having the construction shown in FIG. 1 in the track width direction.

In FIG. 5, an arrow F1 represents the magnetization direction of the first free magnetic layer 10, and an arrow F2 represents the magnetization direction of the second free magnetic layer 8.

As shown in FIG. 5, with a small external magnetic field H, the first and second free magnetic layers 10 and 8 are antiferromagnetically coupled with each other, i.e., the directions of the arrows F1 and F2 are antiparallel to each other. However, with the external magnetic field H of magnitude of over a predetermined level, antiferromagnetic coupling between the first and second free magnetic layer 10 and 8 is broken, and thus the ferrimagnetic state cannot be maintained. This is spin flopping transition. The external magnetic field with which spin flopping transition occurs is the spin flopping field shown by Hsf in FIG. 5.

In FIG. 5, Hcf represents the coercive force of the free magnetic layer 11. The coercive force of the free magnetic layer 11 corresponds to a magnetic field with which the direction of synthetic magnetization $(M_2 \cdot t_2 - M_1 \cdot t_1)$ of the first and second free magnetic layers 10 and 8 is oriented in the direction of the external magnetic field while the magnetization directions of the first and second free magnetic layers 10 and 8 are maintained in the antiparallel state.

Where the magnetic thicknesses of the first and second free magnetic layers 10 and 8 have the relation $M_2 \cdot t_2 > M_1 \cdot t_1$, the spin flopping field Hsf of the free magnetic layer 11 is increased. Therefore, the range of magnetic fields in which the free magnetic layer 11 is maintained in the ferrimagnetic state can be widened to stably maintain the free magnetic layer 11 in the ferrimagnetic state.

Even when the second free magnetic layer 8 comprises the anti-diffusion layer 6, the magnetic effective thickness. $(M_2 \cdot t_2 - M_1 \cdot t_1)$ of the free magnetic layer 11 can be decreased by appropriately controlling the magnetic thicknesses of $M_1 \cdot t_1$ and $M_2 \cdot t_2$ of the first and second free magnetic layers 10 and 8, respectively. Therefore, the magnetization direction of the free magnetic layer 11 can easily be changed even by an external magnetic field of small magnitude, increasing the sensitivity of the spin valve thin film magnetic element 1.

The method of manufacturing the above-described spin valve thin film magnetic element will be described below.

The method of manufacturing the spin valve thin film magnetic element comprises the lamination step of forming a lamination, the first heat treatment step of performing heat treatment in a magnetic field to cause an exchange coupling magnetic field in the interface between the antiferromagnetic layer and the pinned magnetic layer so that the magnetization direction of the pinned magnetic layer is pinned, and the second heat treatment step of performing heat treatment in a magnetic field to orient the magnetization direction of the free magnetic layer in a direction.

In the method of manufacturing the spin valve thin film magnetic element of the present invention, the magnitude of the magnetic field applied to the lamination in the second heat treatment step is set to be larger than the coercive force of the free magnetic layer, and smaller than the magnetic field which causes pin flopping transition in the two magnetic layers.

Each of the steps is described below.

Figure 6:
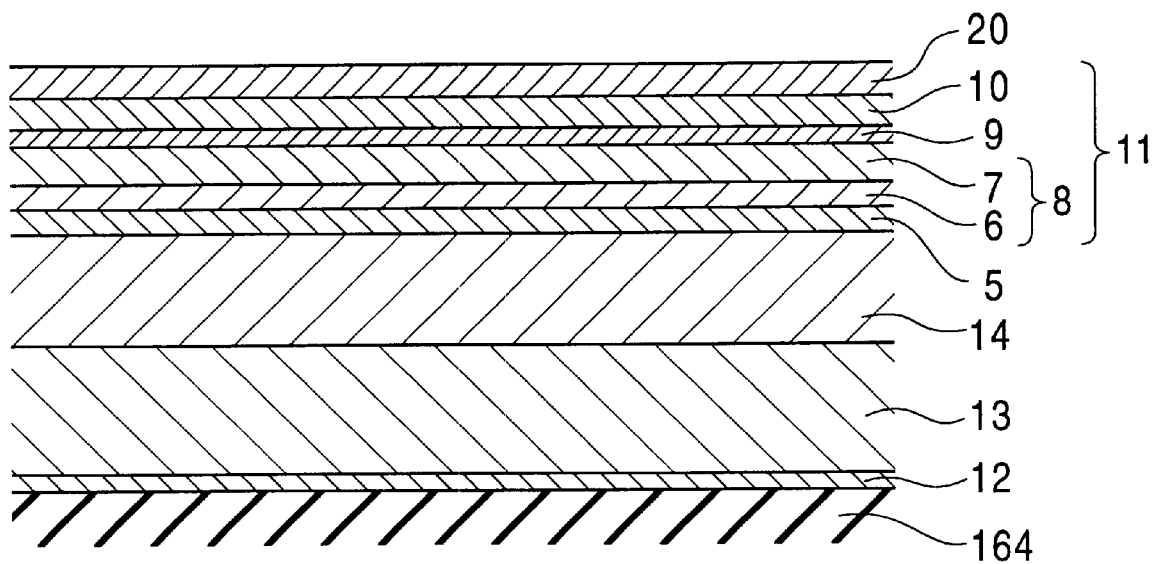
FIG. 6 is a schematic drawing illustrating a step of the method of manufacturing the spin valve thin film magnetic element of the first embodiment of the present invention.

The lamination step is first described. In the lamination step, as shown in FIG. 6, the base layer 12, the antiferromagnetic layer 13, the pinned magnetic layer 4, the nonmagnetic conductive layer 5, the second free magnetic layer 8 comprising the anti-diffusion layer 6 and the ferromagnetic layer 7, the nonmagnetic intermediate layer 9, the first free magnetic layer 10, and the protecting layer 20 are laminated in turn on the lower gap layer 164 to form a multilayered product.

In this step, the thickness of the second free magnetic layer 8 is larger than the thickness of the first free magnetic layer 10. Particularly, the thickness of the second free magnetic layer 8 is preferably in the range of 25 to 45 Å.

Next, the first heat treatment step is performed. In the first heat treatment step, the multilayered product is heat-treated with the magnetic field applied perpendicularly to the track width direction of the multilayered product to order the antiferromagnetic layer 13. This produces an exchange coupling magnetic field in the interface between the antiferromagnetic layer 13 and the pinned magnetic layer 14 to pin the magnetization direction of the pinned magnetic layer 14 in the direction perpendicular to the track width direction.

With the antiferromaghetic layer 13 made of a PtMn alloy, heat treatment is preferably performed at a temperature in the range of 220 to 270° C. The heat treatment at temperature in this range can exhibit a high exchange coupling magnetic field.

The magnitude of the magnetic field applied in heat treatment is preferably 500 Oe or more, more preferably 5 kOe or more. Also, the heat treatment is preferably performed in an inert gas atmosphere or vacuum atmosphere.

Figure 7:
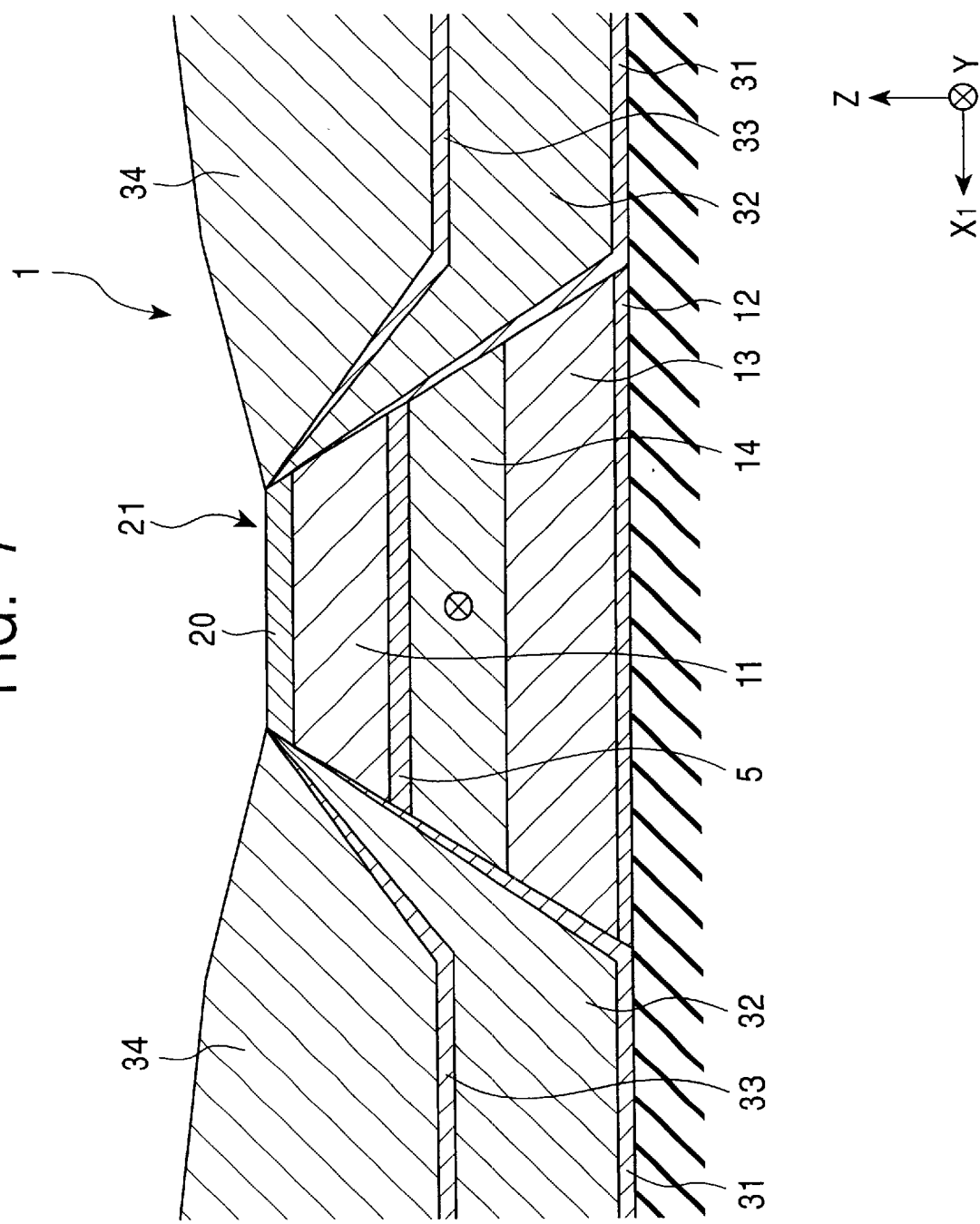
FIG. 7 is a schematic drawing illustrating a step of the method of manufacturing the spin valve thin film magnetic element of the first embodiment of the present invention.

Next, as shown in FIG. 7, lift off resist is formed on the multilayered product, and both sides in the track width direction are etched to form the lamination 21 having a substantially trapezoidal sectional shape. Then, the bias base layers 31, the bias layers 32, the intermediate layers 33, and the conductive layers 34 are formed on both sides of the lamination 21. As a result, the spin valve thin film magnetic element 1 is obtained.

Figure 8:
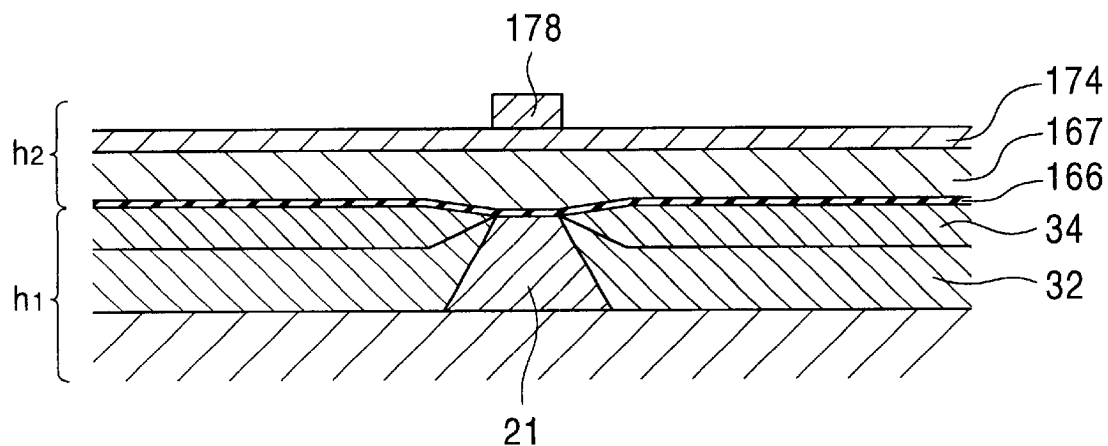
FIG. 8 is a schematic drawing illustrating a step of the method of manufacturing the spin valve thin film magnetic element of the first embodiment of the present invention.

Next, as shown in FIG. 8, the upper gap layer 166, the upper shield layer 167, the gap layer 174, the coil (not shown), the upper insulating layer (not shown), and the upper core layer 178 are formed in turn on the lamination 21 and the conductive layers 34. As a result, the thin film magnetic head $h_1$ comprising the spin valve thin film magnetic element 1, and the inductive head $h_2$ are formed.

Next, the second heat treatment step is performed. In the second heat treatment step, the spin valve thin film magnetic element 1 is heat-treated with the magnetic field applied in the track width direction to orient the direction of induced magnetic anisotropy of the free magnetic layer, which is disturbed by heat treatment for ordering the antiferromagnetic layer, in the track width direction.

In this step, the magnitude of the magnetic field applied lies in a range larger than the coercive force of the free magnetic layer 11, and smaller than the magnetic field which causes, spin flopping transition in the first and second free magnetic layers 10 and 8.

Namely, the magnitude of the applied magnetic field is set to be larger than the coercive force Hcf of the free magnetic layer 11, and smaller than the spin flopping field Hsf of the free magnetic layer 11.

With the coercive force Hcf of the free magnetic layer 11, the magnetization directions of the first and second free magnetic layers 10 and 8 are maintained in the antiparallel state, and the direction of synthetic magnetization ($M_2 \cdot t_2 - M_1 \cdot t_1$) is oriented in the direction of the applied magnetic field.

With the applied magnetic field of magnitude smaller than the coercive force Hcf of the free magnetic layer, the direction of induced magnetic anisotropy of each of the first and second free magnetic layers 10 and 8 cannot be oriented in the track width direction, and thus Barkhausen noise of the free magnetic layer cannot be decreased.

With the applied magnetic field of magnitude larger than the spin flopping field of the free magnetic layer 11, the magnetization directions of the first and second free magnetic layers 10 and 8 cannot be made antiparallel to each other in the second heat treatment step, and thus the direction of induced magnetic anisotropy of the free magnetic layer 11 cannot be oriented in the track width direction.

More specifically, for example, where the free magnetic layer 10 and the ferromagnetic layer 7 are made of a NiFe alloy, and the anti-diffusion layer 6 is made of Co, the magnitude of the applied magnetic field is preferably in the range of 10 to 500 Oe, more preferably in the range of 50 to 200 Oe.

The heat treatment temperature is preferably in the range of 150 to 270° C., more preferably in the range of 170 to 230° C.

Figure 9:
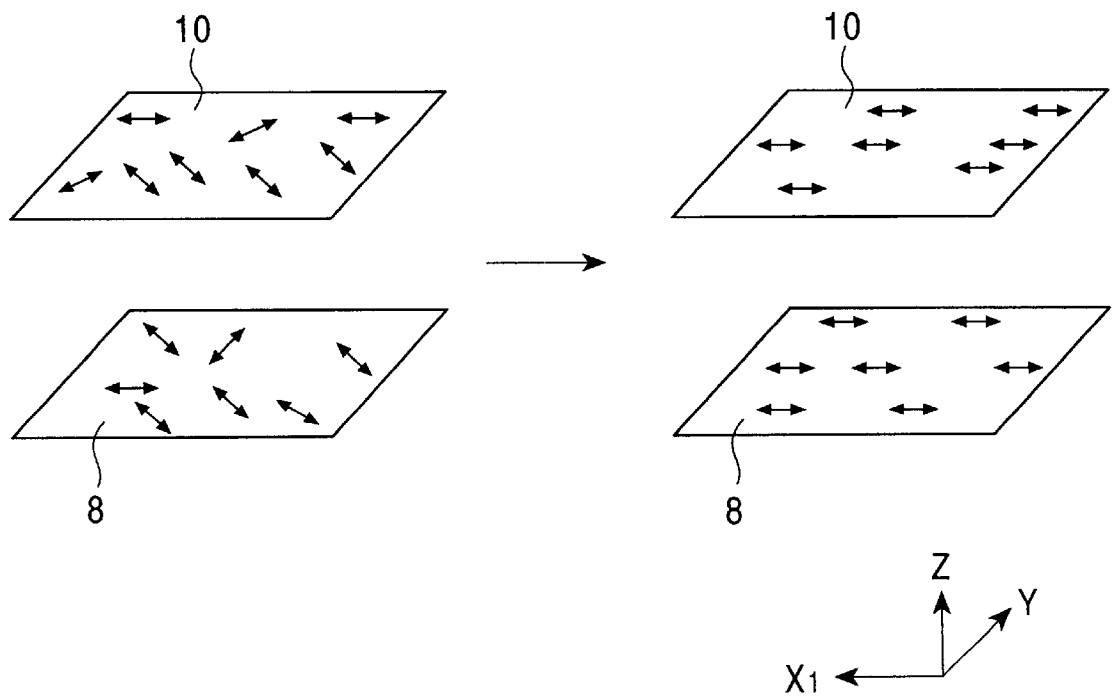
FIG. 9 is a schematic drawing illustrating a step of the method of manufacturing the spin valve thin film magnetic element of the first embodiment of the present invention.

In the second heat treatment step, as shown in FIG. 9, the direction of induced magnetic anisotropy of each of the first and second free magnetic layers 10 and 8, which is disturbed by the first heat treatment step, can be oriented in the track width direction (the $X_1$ direction shown in FIG. 9).

After the second heat treatment step, the third heat treatment step may be performed. In the third heat treatment step, heat treatment is performed at a temperature lower than the heat treatment temperature of the second heat treatment step with the rotating magnetic field applied, which is larger than the coercive force of the free magnetic layer 11 and smaller than the spin flopping field.

The third heat treatment step can decrease the magnetic hysteresis of the free magnetic layer 11, thereby decreasing Barkhausen noise of the free magnetic layer 11.

When the magnitude of the magnetic field applied in the third heat treatment step is smaller than the coercive force of the free magnetic layer 11, the magnetic hysteresis of the free magnetic layer 11 cannot be decreased. On the other hand, when the magnitude of the applied magnetic field is larger than the spin flopping field, the direction of induced magnetic anisotropy of each of the first and second free magnetic layers 10 and 8 is disturbed, thereby undesirably failing to decrease the Barkhausen noise of the free magnetic layer 11.

More specifically, for example, where the first free magnetic layer 10 and the ferromagnetic layer 7 are made of a NiFe alloy, and the anti-diffusion layer 6 is made of Co, the magnitude of the applied magnetic field is preferably in the range of 10 to 500 Oe, more preferably in the range of 50 to 200 Oe.

The heat treatment temperature is preferably in the range of 150 to 270° C., more preferably in the range of 150 to 230° C.

Each of the bias layers 32 is polarized to produce a bias magnetic field in the track width direction. The magnetization direction of the second free magnetic layer 8 is oriented in the track width direction by the bias magnetic field, and the magnetization direction of the first free magnetic layer 10 antiferromagnetically coupled with the second free magnetic layer 8 is oriented in the direction opposite to the magnetization direction of the second free magnetic layer 8.

In this way, the first and second free magnetic layers 10 and 8 are antiferromagnetically coupled with each other so that the magnetization direction of the free magnetic layer 11 is oriented in the track width direction.

As a result, the above-described spin valve thin film magnetic element 1 is obtained.

SECOND EMBODIMENT

A spin valve thin film magnetic element in accordance with a second embodiment of the present invention is described.

Figure 10:
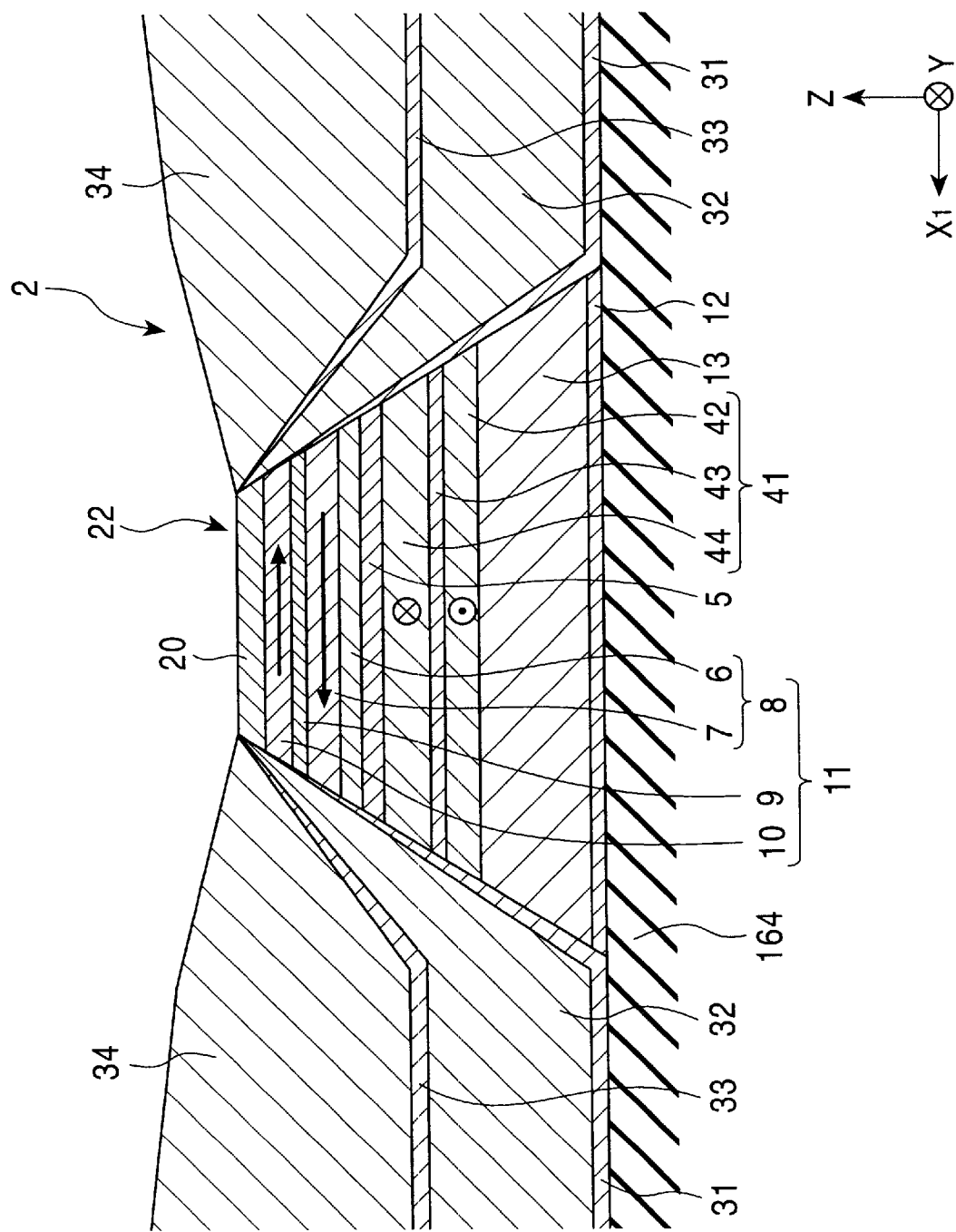
FIG. 10 is a schematic sectional view of a spin valve thin film magnetic element according to a second embodiment of the present invention, as viewed from the magnetic recording medium side.
Figure 11:
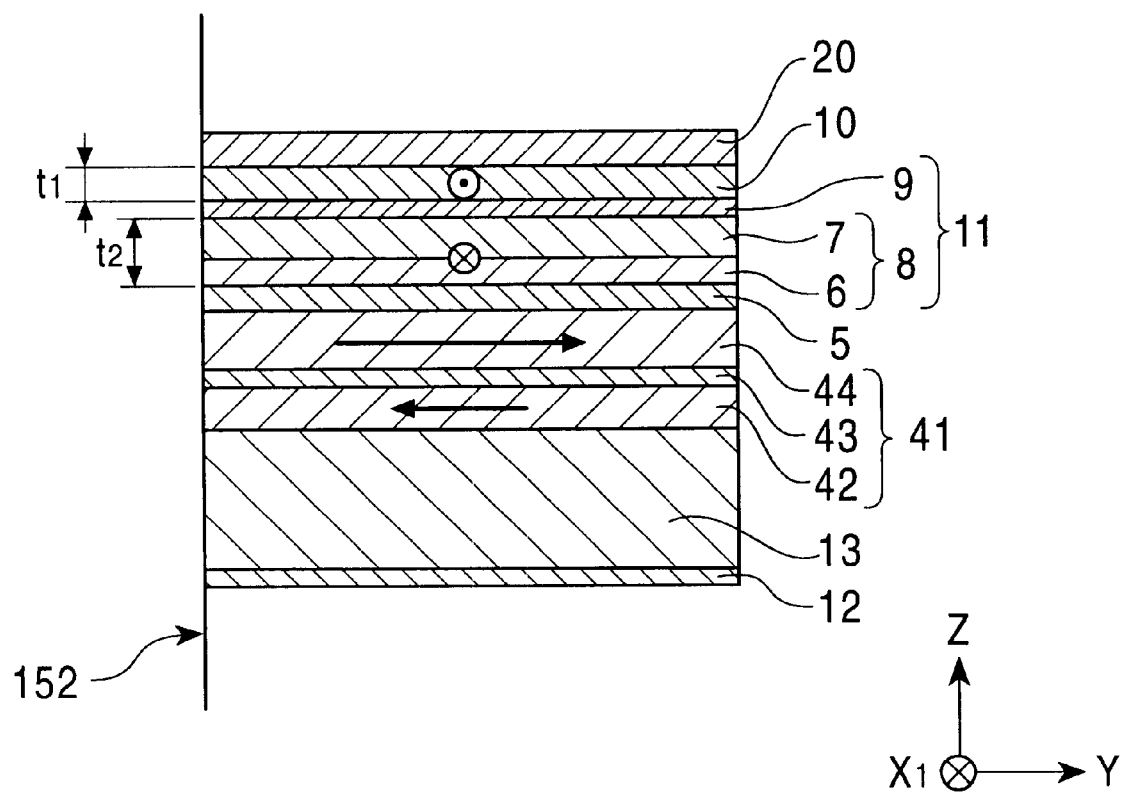
FIG. 11 is a schematic sectional view of the spin valve thin film magnetic element shown in FIG. 10, as viewed from the track width direction.

FIG. 10 is a schematic sectional view of the spin valve thin film magnetic element according to the second embodiment of the present invention, as viewed from the magnetic recording medium side, and FIG. 11 is a schematic sectional view of the spin valve thin film magnetic element, as viewed from the track width direction.

Of the components shown in FIGS. 10 and 11, the same components as those shown in FIGS. 1 and 2 are denoted by the same reference numerals as FIGS. 1 and 2, and thus the same components are not described or briefly described below.

In FIGS. 10 and 11, the Z direction coincides with the movement direction of the magnetic recording medium, the Y direction coincides with the direction of a leakage magnetic field from the magnetic recording medium, and the $X_1$ direction coincides with the track width direction of the spin valve thin film magnetic element 2.

The spin valve thin film magnetic element 2 shown in FIGS. 10 and 11 is a bottom-type single spin valve thin film magnetic element in which an antiferromagnetic layer 13, a pinned magnetic layer 41, a nonmagnetic conductive layer 5, and a free magnetic layer 11 are laminated in turn, the pinned magnetic layer 41 comprising a nonmagnetic layer 43, and first and second pinned magnetic layers 42 and 44 with the nonmagnetic layer 43 provided therebetween.

In FIGS. 10 and 11, reference numeral 164 denotes a lower gap layer, and reference numeral 12 denotes a base layer made laminated on the insulating layer 164. The antiferromagnetic layer 13 is laminated on the base layer 12, the pinned magnetic layer 41 is laminated on the antiferromagnetic layer 13, and the nonmagnetic conductive layer 5 is laminated on the pinned magnetic layer 41. Furthermore, the free magnetic layer 11 is laminated on the nonmagnetic conductive layer 5, and a protecting layer 20 is laminated on the free magnetic layer 11.

In this way, the layers from the base layer 12 to the protecting layer 20 are laminated in turn to form a lamination 22 having a substantially trapezoidal sectional shape having a width corresponding to the track width.

Furthermore, bias layers 32 are formed on both sides of the lamination 22 in the $X_1$ direction, i.e., both sides in the track width direction. The bias layers 32 are provided for orienting the magnetization direction of the free magnetic layer 11, decreasing Barkhausen noise of the free magnetic layer 11.

Reference numeral 34 denotes a conductive layer. The conductive layers 34 are laminated on the bias layers 32, for applying a sensing current to the lamination 22.

Also, bias base layers 31 are provided between the bias layers 32 and the lower gap layer 164, and between the bias layers 32 and the lamination 22.

Furthermore, intermediate layers 33 are provided between the bias layers 32 and the conductive layers 34.

The antiferromagnetic layer 13 is preferably made of a PtMn alloy. The PtMn alloy has excellent corrosion resistance, and a high blocking temperature and a high exchange coupling magnetic field, as compared with a NiMn alloy and FeMn alloy conventionally used for antiferromagnetic layers.

Also, the antiferromagnetic layer 13 may be made of an alloy represented by the formula X—Mn (wherein X represents one element selected from Pt, Pd, Ru, Ir, Rh, and Os), or the formula X'—Mn (wherein X' represents at least one element selected from Pt, Pd, Cr, Ni, Ru, Ir, Rh, Os, Au, and Ag).

The antiferromagnetic layer 13 has the same composition as the antiferromagnetic layer of the first embodiment.

The pinned magnetic layer 41 comprises a nonmagnetic layer 43, and first and second pinned magnetic layers 42 and 44 with the nonmagnetic layer 43 provided therebetween. The first pinned magnetic layer 42 is provided in contact with the antiferromagnetic layer 13 on the antiferromagnetic layer side of the nonmagnetic layer 43, and the second pinned magnetic layer 44 provided in contact with the nonmagnetic conductive layer 5 on the nonmagnetic conductive layer side of the nonmagnetic layer 43.

An exchange coupling magnetic field (exchange anisotropic magnetic field) occurs in the interface between the first pinned magnetic layer 42 and the antiferromagnetic layer 13 so that the magnetization direction of the first pinned magnetic layer 42 is pinned in the Y direction.

The thicknesses of the first and second pinned magnetic layers 42 and 43 are preferably slightly different. In FIGS. 10 and 11, the thickness of the second pinned magnetic layer 44 is larger than the thickness of the first pinned magnetic layer 42.

The magnetization direction of the first pinned magnetic layer 42 is pinned in the direction opposite to the Y direction by the exchange coupling magnetic field with the antiferromagnetic layer 13, and the second pinned magnetic layer 44 is antiferromagnetically coupled with the first pinned magnetic layer 42 so that the magnetization direction is pinned in the Y direction.

Since the magnetization directions of the first and second pinned magnetic layers 42 and 44 are antiparallel to each other, the magnetic moments of the first and second pinned magnetic layers 42 and 44 cancel each other. However, the thickness of the second pinned magnetic layer 44 is slightly larger than the other, and spontaneous magnetization of the pinned magnetic layer 41 consequently remains to cause the ferrimagnetic state. The spontaneous magnetization is further amplified by the exchange coupling magnetic field with the antiferromagnetic layer 13 to pin the magnetization direction of the pinned magnetic layer 41 in the Y direction.

Each of the first and second pinned magnetic layers 42 and 44 is made of a ferromagnetic material, for example, a NiFe alloy, Co, a CoNiFe alloy, a CoFe alloy, a CoNi alloy, or the like, preferably made of Co. The first and second pinned magnetic layers 42 and 44 are preferably made of the same material.

The nonmagnetic layer 43 is preferably made of a nonmagnetic material, for example, one of Ru, Rh, Ir, Cr, Re, and Cu, or an alloy thereof, more preferably made of Ru.

Referring to FIGS. 10 and 11, the free magnetic layer 11 comprises a nonmagnetic intermediate layer 9, and first and second free magnetic layers 10 and 8 with the nonmagnetic intermediate layer 9 provided therebetween. The first free magnetic layer 10 is provided on the protecting layer 20 side of the nonmagnetic intermediate layer 9, and the second free magnetic layer 8 is provided on the nonmagnetic conductive layer side of the nonmagnetic intermediate layer 9.

The first free magnetic layer 10 and the nonmagnetic intermediate layer 9 comprise the same materials as the first free magnetic layer and the nonmagnetic intermediate layer of the first embodiment.

The second free magnetic layer 8 comprises an anti-diffusion layer 6 and a ferromagnetic layer 7.

The anti-diffusion layer 6 and the ferromagnetic layer 7 comprise the same materials as the anti-diffusion layer and the ferromagnetic layer of the first embodiment.

The thickness $t_2$ of the second free magnetic layer 8 is larger than the thickness $t_1$ of the first free magnetic layer 10.

The thickness $t_2$ of the second free magnetic layer 8 is preferably in the range of 25 to 45 Å. With the second free magnetic layer 8 having a thickness $t_2$ beyond the above range, the rate of change in resistance of the spin valve thin film magnetic element 2 cannot be increased.

The thickness $t_1$ of the first free magnetic layer 10 is preferably in the range of 5 to 25 Å.

Assuming that saturation magnetizations of the first and second free magnetic layers 10 and 8 are $M_1$ and $M_2$, respectively, the magnetic thicknesses of the first and second free magnetic layers 10 and 8 are $M_1 \cdot t_1$ and $M_2 \cdot t_2$, respectively.

Since the second free magnetic layer 8 comprises the anti-diffusion layer 6 and the ferromagnetic layer 7, the magnetic thickness $M_2 \cdot t_2$ of the second free magnetic layer 8 is the sum of the magnetic thickness $M_{21} \cdot t_{21}$ of the anti-diffusion layer 6 and the magnetic thickness $M_{22} \cdot t_{22}$ of the ferromagnetic layer 7.

Namely, the following equation is obtained:

$$M_2 \cdot t_2 = M_{21} \cdot t_{21} + M_{22} \cdot t_{22}$$

wherein $M_{21}$ and $t_{21}$ represent the saturation magnetization and thickness of the anti-diffusion layer 6, and $M_{22}$ and $t_{22}$ represent the saturation magnetization and thickness of the ferromagnetic layer 7.

For example, with the anti-diffusion layer 6 made of Co, and the ferromagnetic layer 7 made of a NiFe alloy, the saturation magnetization $M_{21}$ of the anti-diffusion layer 6 is higher than the saturation magnetization $M_{22}$ of the ferromagnetic layer 7.

The free magnetic layer 11 is formed to satisfy the relation $M_2 \cdot t_2 > M_1 \cdot t_1$ between the magnetic thicknesses of the first and second free magnetic layers 10 and 8.

Also, the first and second free magnetic layers 10 and 8 are antiferromagnetically coupled with each other. Namely, when the magnetization direction of the second free magnetic layer 8 is oriented in the $X_1$ direction by the bias layers 32, the magnetization direction of the first free magnetic layer 10 is oriented in the direction opposite to the $X_1$ direction.

Since the magnetic thicknesses of the first and second free magnetic layers 10 and 8 have the relation $M_2 \cdot t_2 > M_1 \cdot t_1$, magnetization of the second free magnetic layer 8 remains to orient the magnetization direction of the free magnetic layer 11 in the $X_1$ direction. At this time, the effective thickness of the free magnetic layer 11 is represented by $(M_2 \cdot t_2 - M_1 \cdot t_1)$ In this way, the first and second free magnetic layers 10 and 8 are antiferromagnetically coupled with each other so that the magnetization directions thereof are antiparallel to each other, and the magnetic thicknesses thereof have the relation $M_2 \cdot t_2 > M_1 \cdot t_1$ to bring the first and second free magnetic layers 10 and 8 in a synthetic ferrimagnetic state.

Consequently, the magnetization direction of the free magnetic layer 11 crosses the magnetization direction of the pinned magnetic layer 41.

In the spin valve thin film magnetic element 2, when the magnetization direction of the free magnetic layer 11, which is oriented in the $X_1$ direction, is changed by a leakage magnetic field from a recording medium such as a hard disk or the like, the electric resistance changes with the relation to magnetization of the pinned magnetic layer 41, which is pinned in the Y direction, so that the leakage magnetic field from the recording medium is detected by a voltage change based on the change in the electric resistance value.

Since the magnetic thicknesses of the first and second free magnetic layer 10 and 8 have the relation $M_2 \cdot t_2 > M_1 \cdot t_1$, the spin flopping field of the free magnetic layer 11 can be increased. Therefore, the range of magnetic fields in which the free magnetic layer 11 is maintained in the ferrimagnetic state can be widened to stably maintain the free magnetic layer 11 in the ferrimagnetic state.

Even when the second free magnetic layer 8 comprises the anti-diffusion layer 6, the magnetic effective thickness $(M_2 \cdot t_2 - M_1 \cdot t_1)$ of the free magnetic layer 11 can be decreased by appropriately controlling the magnetic thicknesses of $M_1 \cdot t_1$ and $M_2 \cdot t_2$ of the first and second free magnetic layers 10 and 8, respectively. Therefore, the magnetization direction of the free magnetic layer 11 can easily be changed even by an external magnetic field of small magnitude, increasing the sensitivity of the spin valve thin film magnetic element 2.

In addition, the pinned magnetic layer 41 comprises the nonmagnetic layer 43, and the first and second pinned magnetic layers 42 and 44, the first and second pinned magnetic layers 42 and 44 being antiferromagnetically coupled with each other to create the relation that the magnetic moments of both layers cancel each other. However, the thickness of the first pinned magnetic layer 42 is slightly larger than the other, and consequently the spontaneous magnetization resulting from the first pinned magnetic layer 42 slightly remains to bring the pinned magnetic layer 41 into the ferrimagnetic state. The spontaneous magnetization is further amplified by the exchange coupling magnetic field with the antiferromagnetic layer 13 to strongly pin the magnetization direction of the pinned magnetic layer 41 in the Y direction, thereby improving the stability of the spin valve thin film magnetic element 2.

The spin valve thin film magnetic element 2 is manufactured by the same method as the above-described spin valve thin film magnetic element 1 of the first embodiment except that the base layer 12, the antiferromagnetic layer 13, the first pinned magnetic layer 42, the nonmagnetic layer 43, the second pinned magnetic layer 44, the nonmagnetic conductive layer 5, the second free magnetic layer 8, the nonmagnetic intermediate layer 9, the first free magnetic layer 10, and the protecting layer 20 are laminated in turn to form the multilayered product.

THIRD EMBODIMENT

A spin valve thin film magnetic element in accordance with a third embodiment of the present invention is described.

Figure 12:
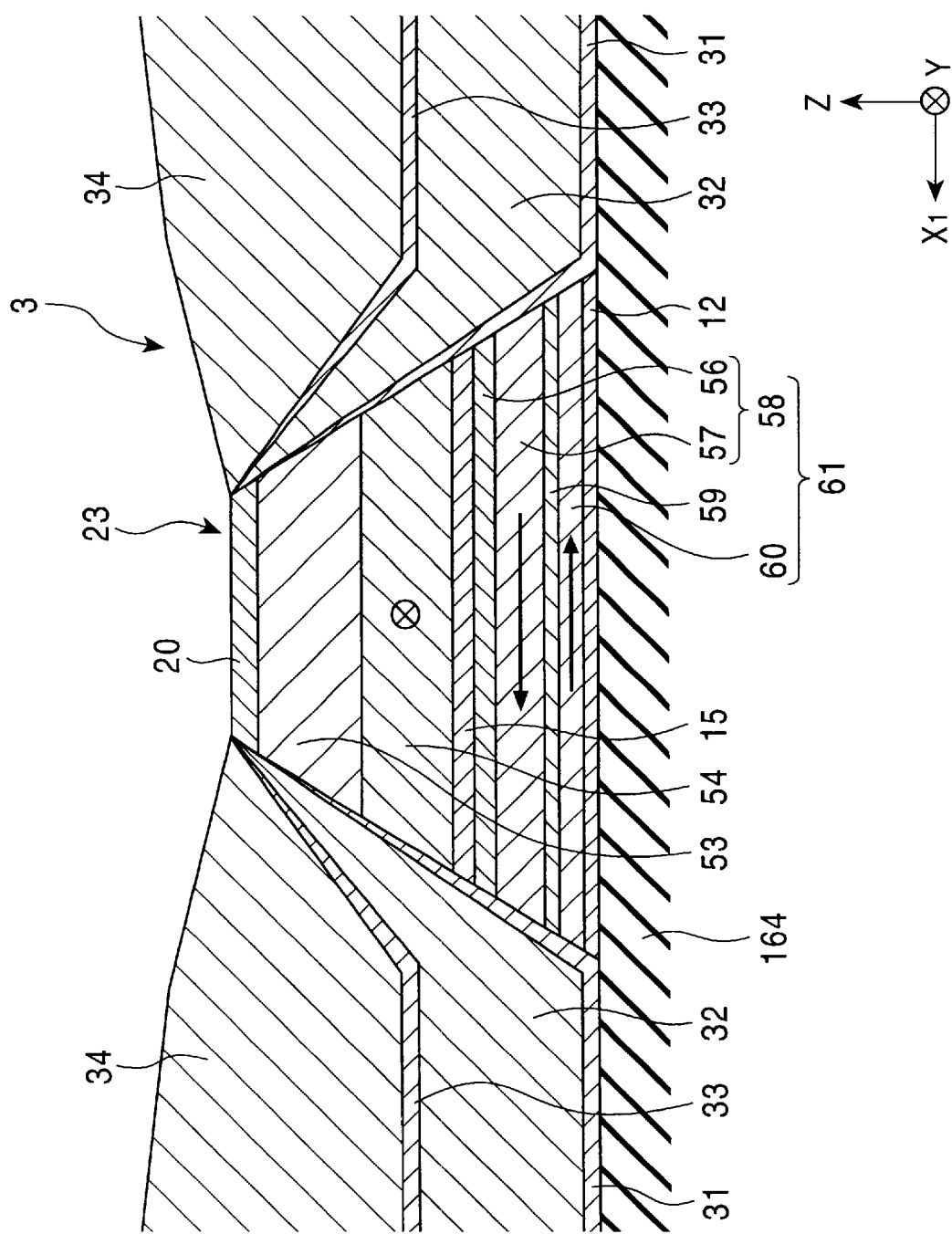
FIG. 12 is a schematic sectional view of a sin valve thin film magnetic element according to a third embodiment of the present invention, as viewed from the magnetic recording medium side.
Figure 13:
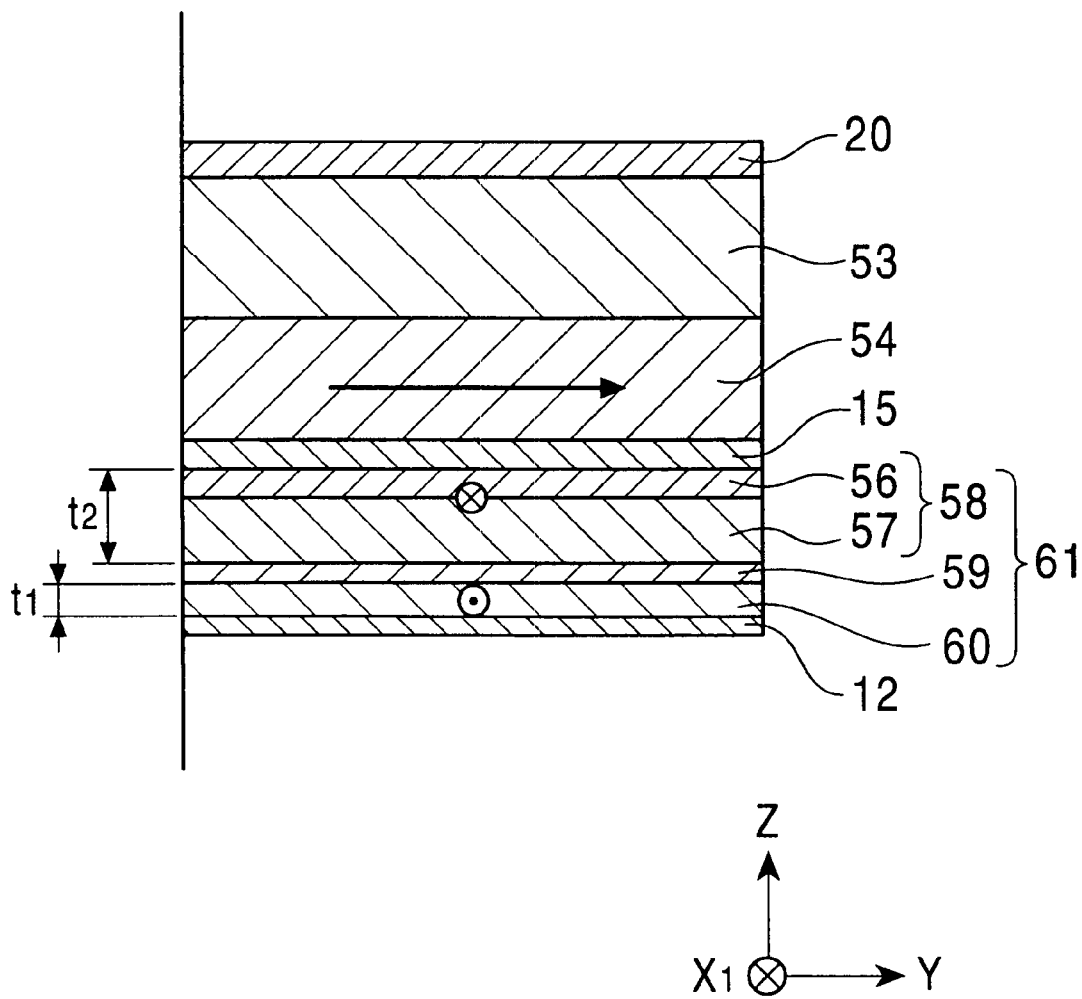
FIG. 13 is a schematic sectional view of the spin valve thin film magnetic element shown in FIG. 12, as viewed from the track width direction.

FIG. 12 is a schematic sectional view of the spin valve thin film magnetic element according to the third embodiment of the present invention, as viewed from the magnetic recording medium side, and FIG. 13 is a schematic sectional view of the spin valve thin film magnetic element, as viewed from the track width direction.

Of the components shown in FIGS. 12 and 13, the same components as those shown in FIGS. 1 and 2 are denoted by the same reference numerals as FIGS. 1 and 2, and thus the same components are not described or briefly described below.

In FIGS. 12 and 13, the Z direction coincides with the movement direction of the magnetic recording medium, the Y direction coincides with the direction of a leakage magnetic field from the magnetic recording medium, and the $X_1$ direction coincides with the track width direction of the spin valve thin film magnetic element 3.

Like the spin valve thin film magnetic element 1 of the first embodiment, the spin valve thin film magnetic element 3 shown in FIGS. 12 and 13 is provided on a thin film magnetic head $h_1$ to constitute a floating magnetic head.

The spin valve thin film magnetic element 3 is a top-type single spin valve thin film magnetic element in which a free magnetic layer 61, a nonmagnetic conductive layer 15, a pinned magnetic layer 54, and an antiferromagnetic layer 53 are laminated in turn.

In FIGS. 12 and 13, reference numeral 164 denotes a lower gap layer, and reference numeral 12 denotes a base layer made laminated on the insulating layer 164. The free magnetic layer 61 is laminated on the base layer 12, the nonmagnetic conductive layer 15 is laminated on the free magnetic layer 61, and the pinned magnetic layer 54 is laminated on the nonmagnetic conductive layer 15. Furthermore, the antiferromagnetic layer 53 is laminated on the pinned magnetic layer 54, and a protecting layer 20 is laminated on the antiferromagnetic layer 53.

In this way, the layers from the base layer 12 to the protecting layer 20 are laminated in turn to form a lamination 23 having a substantially trapezoidal sectional shape having a width corresponding to the track width.

Furthermore, bias layers 32 are formed on both sides of the lamination 23 in the $X_1$ direction, i.e., both sides in the track width direction. The bias layers 32 are provided for orienting the magnetization direction of the free magnetic layer 61, decreasing Barkhausen noise of the free magnetic layer 61.

Reference numeral 34 denotes a conductive layer. The conductive layers 34 are laminated on the bias layers 32, for applying a sensing current to the lamination 23.

Also, bias base layers 31 are provided between the bias layers 32 and the lower gap layer 164, and between the bias layers 32 and the lamination 23.

Furthermore, intermediate layers 33 are provided between the bias layers 32 and the conductive layers 34.

The antiferromagnetic layer 53 is preferably made of a PtMn alloy. The PtMn alloy has excellent corrosion resistance, and a high blocking temperature and a high exchange coupling magnetic field, as compared with a NiMn alloy and FeMn alloy conventionally used for antiferromagnetic layers.

Also, the antiferromagnetic layer 53 may be made of an alloy represented by the formula X—Mn (wherein X represents one element selected from Pt, Pd, Ru, Ir, Rh, and Os), or the formula X'—Mn (wherein X' represents at least one element selected from Pt, Pd, Cr, Ni, Ru, Ir, Rh, Os, Au, and Ag).

In an alloy represented by the formula X—Mn or X'—Mn, the content of Pt or X is preferably in the range of 37 to 63 atomic %, more preferably in the range of 47 to 57 atomic %.

In addition, in an alloy presented by the formula X'—Mn, the content of X' is preferably in the range of 37 to 63 atomic %, more preferably in the range of 47 to 57 atomic %. Furthermore, X' of an alloy presented by the formula X'—Mn is preferably in the range of 0.2 to 10 atomic %.

An alloy in the above-described proper composition range used for the antiferromagnetic layer 53 is heat-treated in a magnetic field to obtain the antiferromagnetic layer 53 producing a high exchange coupling magnetic field. Particularly, the PtMn alloy permits the formation of the excellent antiferromagnetic layer 53 having an exchange coupling magnetic field of more than 800 (Oe), and a blocking temperature of as high as 380° C., at which the exchange coupling magnetic field is lost.

The pinned magnetic layer 54 is made of the same ferromagnetic material as the pinned magnetic layer 14 or 41 of the first or second embodiment.

The pinned magnetic layer 54 is laminated in contact with the antiferromagnetic layer 53 to produce an exchange coupling magnetic field (exchange anisotropic magnetic field) in the interface between the pinned magnetic layer 54 and the antiferromagnetic layer 53 so that the magnetization direction of the pinned magnetic layer 54 is pinned in the Y direction.

The nonmagnetic conductive layer 15 is made of the same material as the nonmagnetic conductive layer 5 of the first or second embodiment.

Referring to FIGS. 12 and 13, the free magnetic layer 61 comprises a nonmagnetic intermediate layer 59, and first and second free magnetic layers 60 and 58 with the nonmagnetic intermediate layer 59 provided therebetween. The first free magnetic layer 60 is provided on the base layer 12 side of the nonmagnetic intermediate layer 59, and the second free magnetic layer 58 is provided on the nonmagnetic conductive layer 15 side of the nonmagnetic intermediate layer 59.

The first free magnetic layer 60 comprises the same material as the first free magnetic layer 10 of the first or second embodiment.

The nonmagnetic intermediate layer 59 is the same nonmagnetic material as the nonmagnetic intermediate layer 9 of the first or second embodiment.

The second free magnetic layer 58 comprises an anti-diffusion layer 56 and a ferromagnetic layer 57.

The anti-diffusion layer 56 is provided for preventing mutual diffusion between the ferromagnetic layer 57 and the nonmagnetic conductive layer 15, and is made of the same material as the anti-diffusion layer 6 of the first or second embodiment.

The ferromagnetic layer 57 is made of the same ferromagnetic material as the ferromagnetic layer 7 of the first or second embodiment.

The thickness $t_2$ of the second free magnetic layer 58 is larger than the thickness $t_1$ of the first free magnetic layer 60.

The thickness $t_2$ of the second free magnetic layer 58 is preferably in the range of 25 to 45 Å. With the second free magnetic layer 58 having a thickness $t_2$ beyond the above range, the rate of change in resistance of the spin valve thin film magnetic element 3 cannot be increased.

The thickness $t_1$ of the first free magnetic layer 60 is preferably in the range of 5 to 25 Å.

Assuming that saturation magnetizations of the first and second free magnetic layers 60 and 58 are $M_1$ and $M_2$, respectively, the magnetic thicknesses of the first and second free magnetic layers 60 and 58 are $M_1 \cdot t_1$ and $M_2 \cdot t_2$, respectively.

Since the second free magnetic layer 58 comprises the anti-diffusion layer 56 and the ferromagnetic layer 57, the magnetic thickness $M_2 \cdot t_2$ of the second free magnetic layer 58 is the sum of the magnetic thickness $M_{21} \cdot t_{21}$ of the anti-diffusion layer 56 and the magnetic thickness $M_{22} \cdot t_{22}$ of the ferromagnetic layer 57.

Namely, the following equation is obtained:

$$M_2 \cdot t_2 = M_{21} \cdot t_{21} + M_{22} \cdot t_{22}$$

wherein $M_{21}$ and $t_{21}$ represent the saturation magnetization and thickness of the anti-diffusion layer 56, and $M_{22}$ and $t_{22}$ represent the saturation magnetization and thickness of the ferromagnetic layer 57.

For example, with the anti-diffusion layer 56 made of Co, and the ferromagnetic layer 57 made of a NiFe alloy, the saturation magnetization $M_{21}$ of the anti-diffusion layer 56 is higher than the saturation magnetization $M_{22}$ of the ferromagnetic layer 57.

The free magnetic layer 61 is formed to satisfy the relation $M_2 \cdot t_2 > M_1 \cdot t_1$ between the magnetic thicknesses of the first and second free magnetic layers 60 and 58.

Also, the first and second free magnetic layers 60 and 58 are antiferromagnetically coupled with each other. Namely, when the magnetization direction of the second free magnetic layer 58 is oriented in the $X_1$ direction by the bias layers 32, the magnetization direction of the first free magnetic layer 60 is oriented in the direction opposite to the $X_1$ direction.

Since the magnetic thicknesses of the first and second free magnetic layers 60 and 58 have the relation $M_2 \cdot t_2 > M_1 \cdot t_1$, magnetization of the second free magnetic layer 58 remains to orient the magnetization direction of the free magnetic layer 61 in the $X_1$ direction. At this time, the effective thickness of the free magnetic layer 61 is represented by $(M_2 \cdot t_2 - M_1 \cdot t_1)$.

In this way, the first and second free magnetic layers 60 and 58 are antiferromagnetically coupled with each other so that the magnetization directions thereof are antiparallel to each other, and the magnetic thicknesses thereof have the relation $M_2 \cdot t_2 > M_1 \cdot t_1$ to bring the first and second free magnetic layers 60 and 58 in a synthetic ferrimagnetic state.

Consequently, the magnetization direction of the free magnetic layer 61 crosses the magnetization direction of the pinned magnetic layer 54.

In the spin valve thin film magnetic element 3, when the magnetization direction of the free magnetic layer 61, which is oriented in the $X_1$ direction, is changed by a leakage magnetic field from a recording medium such as a hard disk or the like, the electric resistance changes with the relation to magnetization of the pinned magnetic layer 54, which is pinned in the Y direction, so that the leakage magnetic field from the recording medium is detected by a voltage change based on the change in the electric resistance value.

Since the magnetic thicknesses of the first and second free magnetic layer 60 and 58 have the relation $M_2 \cdot t_2 > M_1 \cdot t_1$, the spin flopping field of the free magnetic layer 61 can be increased. Therefore, the range of magnetic fields in which the free magnetic layer 61 is maintained in the ferrimagnetic state can be widened to stably maintain the free magnetic layer 61 in the ferrimagnetic state.

Even when the second free magnetic layer 58 comprises the anti-diffusion layer 56, the magnetic effective thickness $(M_2 \cdot t_2 - M_1 \cdot t_1)$ of the free magnetic layer 61 can be decreased by appropriately controlling the magnetic thicknesses of $M_1 \cdot t_1$ and $M_2 \cdot t_2$ of the first and second free magnetic layers 60 and 58, respectively. Therefore, the magnetization direction of the free magnetic layer 61 can easily be changed even by an external magnetic field of small magnitude, increasing the sensitivity of the spin valve thin film magnetic element 3.

The spin valve thin film magnetic element 3 is manufactured by the same method as the above-described spin valve thin film magnetic element 1 of the first embodiment except that the base layer 12, the first free magnetic layer 60, the nonmagnetic intermediate layer 59, the second free magnetic layer 58, the nonmagnetic conductive layer 15, the pinned magnetic layer 54, the antiferromagnetic layer 53, and the protecting layer 20 are laminated in turn to form the multilayered product.

FOURTH EMBODIMENT

A spin valve thin film magnetic element in accordance with a fourth embodiment of the present invention is described.

Figure 14:
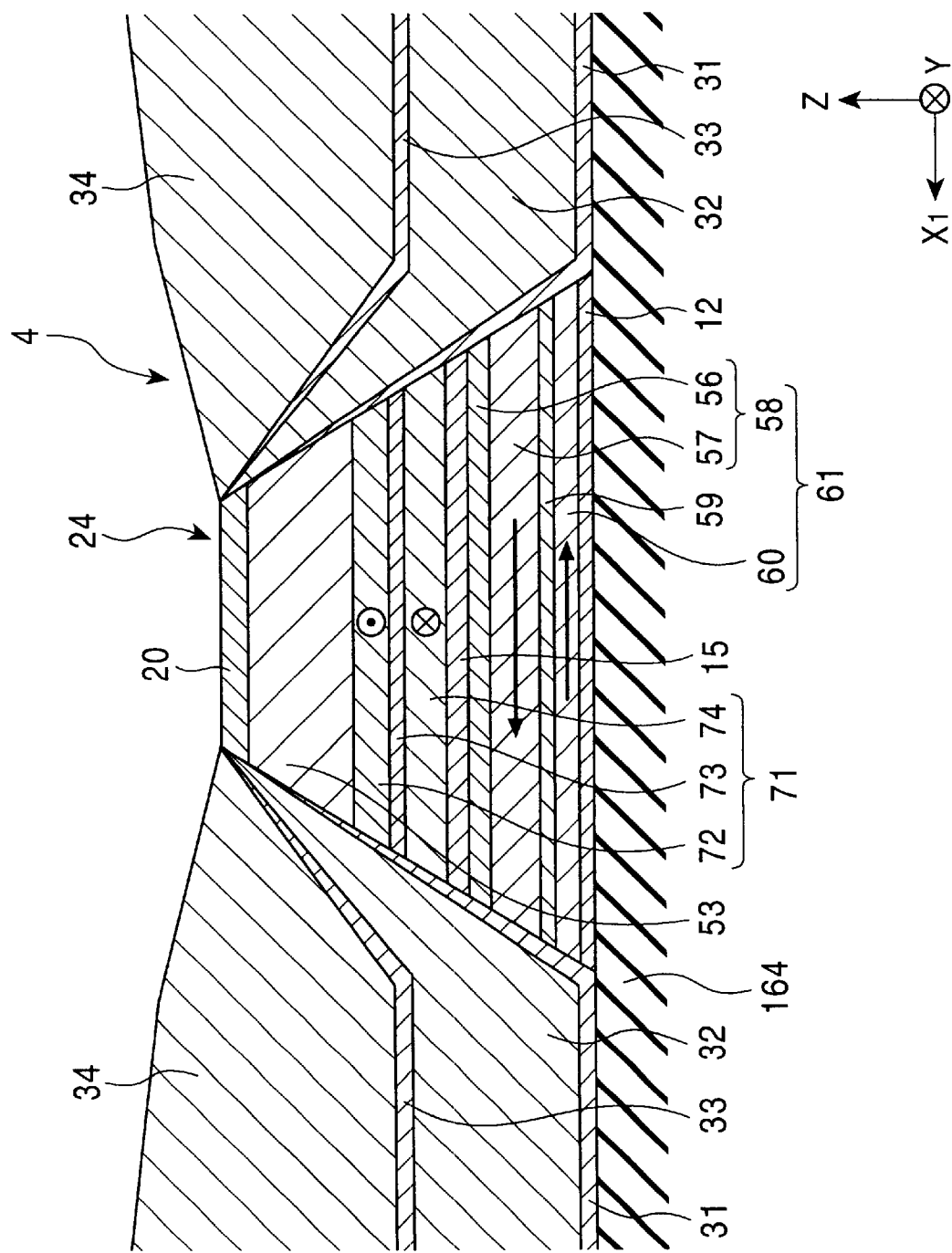
FIG. 14 is a schematic sectional view of a sin valve thin film magnetic element according to a fourth embodiment of the present invention, as viewed from the magnetic recording medium side.
Figure 15:
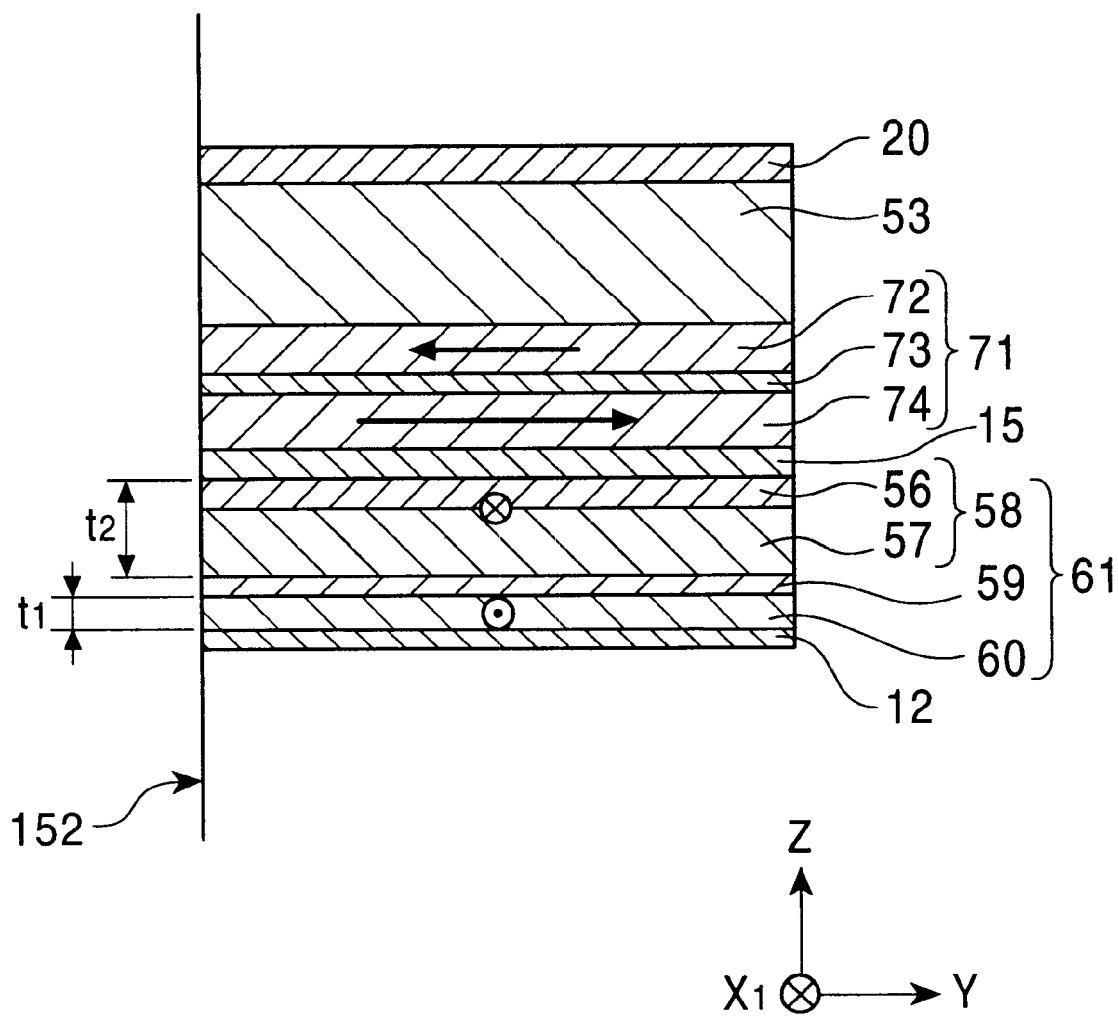
FIG. 15 is a schematic sectional view of the spin valve thin film magnetic element shown in FIG. 14, as viewed from the track width direction.

FIG. 14 is a schematic sectional view of the spin valve thin film magnetic element according to the fourth embodiment of the present invention, as viewed from the magnetic recording medium side, and FIG. 15 is a schematic sectional view of the spin valve thin film magnetic element, as viewed from the track width direction.

Of the components shown in FIGS. 14 and 15, the same components as those shown in FIGS. 12 and 13 are denoted by the same reference numerals as FIGS. 12 and 13, and thus the same components are not described or briefly described below.

In FIGS. 14 and 15, the Z direction coincides with the movement direction of the magnetic recording medium, the Y direction coincides with the direction of a leakage magnetic field from the magnetic recording medium, and the $X_1$ direction coincides with the track width direction of the spin valve thin film magnetic element 2.

Like the spin valve thin film magnetic element 1 of the first embodiment, the spin valve thin film magnetic element 4 shown in FIGS. 14 and 15 is provided on a thin film magnetic head h1 to constitute a floating magnetic head.

The spin valve thin film magnetic element 4 is a top-type single spin valve thin film magnetic element in which a free magnetic layer 61, a nonmagnetic conductive layer 15, a pinned magnetic layer 71, and an antiferromagnetic layer 53 are laminated in turn.

In FIGS. 14 and 15, reference numeral 164 denotes a lower gap layer, and reference numeral 12 denotes a base layer made laminated on the insulating layer 164. The free magnetic layer 61 is laminated on the base layer 12, the nonmagnetic conductive layer 15 is laminated on the free magnetic layer 61, and the pinned magnetic layer 71 is laminated on the nonmagnetic conductive layer 15. Furthermore, the antiferromagnetic layer 53 is laminated on the pinned magnetic layer 71, and a protecting layer 20 is laminated on the antiferromagnetic layer 53.

In this way, the layers from the base layer 12 to the protecting layer 20 are laminated in turn to form a lamination 24 having a substantially trapezoidal sectional shape having a width corresponding to the track width.

Furthermore, bias layers 32 are formed on both sides of the lamination 24 in the $X_1$ direction, i.e., both sides in the track width direction. The bias layers 32 are provided for orienting the magnetization direction of the free magnetic layer 61, decreasing Barkhausen noise of the free magnetic layer 61.

Reference numeral 34 denotes a conductive layer. The conductive layers 34 are laminated on the bias layers 32, for applying a sensing current to the lamination 24.

Also, bias base layers 31 are provided between the bias layers 32 and the lower gap layer 164, and between the bias layers 32 and the lamination 24.

Furthermore, intermediate layers 33 are provided between the bias layers 32 and the conductive layers 34.

The antiferromagnetic layer 53 is preferably made of a PtMn alloy. The PtMn alloy has excellent corrosion resistance, and a high blocking temperature and a high exchange coupling magnetic field, as compared with a NiMn alloy and FeMn alloy conventionally used for antiferromagnetic layers.

Also, the antiferromagnetic layer 53 may be made of an alloy represented by the formula X—Mn (wherein X represents one element selected from Pt, Pd, Ru, Ir, Rh, and Os), or the formula X'—Mn (wherein X' represents at least one element selected from Pt, Pd, Cr, Ni, Ru, Ir, Rh, Os, Au, and Ag).

The antiferromagnetic layer 53 has the same composition as the antiferromagnetic layer of the third embodiment.

The pinned magnetic layer 71 comprises a nonmagnetic layer 73, and first and second pinned magnetic layers 72 and 74 with the nonmagnetic layer 73 provided therebetween. The first pinned magnetic layer 72 is provided in contact with the antiferromagnetic layer 53 on the antiferromagnetic layer side of the nonmagnetic layer 73, and the second pinned magnetic layer 74 provided in contact with the nonmagnetic conductive layer 15 on the nonmagnetic conductive layer 15 side of the nonmagnetic layer 73.

An exchange coupling magnetic field (exchange anisotropic magnetic field) occurs in the interface between the first pinned magnetic layer 72 and the antiferromagnetic layer 53 so that the magnetization direction of the first pinned magnetic layer 72 is pinned in the direction opposite to the Y direction.

The thicknesses of the first and second pinned magnetic layers 72 and 73 are preferably slightly different. In FIGS. 14 and 15, the thickness of the second pinned magnetic layer 74 is larger than the thickness of the first pinned magnetic layer 72.

The magnetization direction of the first pinned magnetic layer 72 is pinned in the direction opposite to the Y direction by the exchange coupling magnetic field with the antiferromagnetic layer 53, and the second pinned magnetic layer 74 is antiferromagnetically coupled with the first pinned magnetic layer 72 so that the magnetization direction is pinned in the Y direction.

Since the magnetization directions of the first and second pinned magnetic layers 72 and 74 are antiparallel to each other, the magnetic moments of the first and second pinned magnetic layers 72 and 74 cancel each other. However, the thickness of the second pinned magnetic layer 74 is slightly larger than the other, and spontaneous magnetization of the pinned magnetic layer 71 consequently remains to cause the ferrimagnetic state. The spontaneous magnetization is further amplified by the exchange coupling magnetic field with the antiferromagnetic layer 53 to pin the magnetization direction of the pinned magnetic layer 71 in the Y direction.

Both the first and second pinned magnetic layers 72 and 74 are made of the same ferromagnetic materials as the first and second pinned magnetic layers 42 and 44 of the second embodiment. The first and second pinned magnetic layers 72 and 74 are preferably made of the same material.

The nonmagnetic layer 73 is preferably made of the same nonmagnetic material as the nonmagnetic material 43 of the second embodiment.

The nonmagnetic conductive layer 15 is made of the same material as the nonmagnetic conductive layer 5 of the first or second embodiment.

Referring to FIGS. 14 and 15, the free magnetic layer 61 comprises a nonmagnetic intermediate layer 59, and first and second free magnetic layers 60 and 58 with the nonmagnetic intermediate layer 59 provided therebetween. The first free magnetic layer 60 is provided on the base layer 12 side of the nonmagnetic intermediate layer 59, and the second free magnetic layer 58 is provided on the nonmagnetic conductive layer 15 side of the nonmagnetic intermediate layer 59.

The first free magnetic layer 60 is made of the same material as the first free magnetic layer of the third embodiment.

The nonmagnetic intermediate layer 59 is made of the same nonmagnetic material as the nonmagnetic intermediate layer of the third embodiment.

The second free magnetic layer 58 comprises an anti-diffusion layer 56 and a ferromagnetic layer 57.

The anti-diffusion layer 56 is provided for preventing mutual diffusion between the ferromagnetic layer 57 and the nonmagnetic conductive layer 15, and is made of the same material as the anti-diffusion layer of the third embodiment.

The ferromagnetic layer 57 is made of the same ferromagnetic material as the ferromagnetic layer of the third embodiment.

The thickness $t_2$ of the second free magnetic layer 58 is larger than the thickness $t_1$ of the first free magnetic layer 60.

The thickness $t_2$ of the second free magnetic layer 58 is preferably in the range of 25 to 45 Å. With the second free magnetic layer 58 having a thickness $t_2$ beyond the above range, the rate of change in resistance of the spin valve thin film magnetic element 4 cannot be increased.

The thickness $t_1$ of the first free magnetic layer 60 is preferably in the range of 5 to 25 Å.

Assuming that saturation magnetizations of the first and second free magnetic layers 60 and 58 are $M_1$ and $M_2$, respectively, the magnetic thicknesses of the first and second free magnetic layers 60 and 58 are $M_1 \cdot t_1$ and $M_2 \cdot t_2$, respectively.

Since the second free magnetic layer 58 comprises the anti-diffusion layer 56 and the ferromagnetic layer 57, the magnetic thickness $M_2 \cdot t_2$ of the second free magnetic layer 58 is the sum of the magnetic thickness $M_{21} \cdot t_{21}$ of the anti-diffusion layer 56 and the magnetic thickness $M_{22} \cdot t_{22}$ of the ferromagnetic layer 57.

Namely, the following equation is obtained:

$$M_2 \cdot t_2 = M_{21} \cdot t_{21} + M_{22} \cdot t_{22}$$

wherein $M_{21}$ and $t_{21}$ represent the saturation magnetization and thickness of the anti-diffusion layer 56, and $M_{22}$ and $t_{22}$ represent the saturation magnetization and thickness of the ferromagnetic layer 57.

For example, with the anti-diffusion layer 56 made of Co, and the ferromagnetic layer 57 made of a NiFe alloy, the saturation magnetization $M_{21}$ of the anti-diffusion layer 56 is higher than the saturation magnetization $M_{22}$ of the ferromagnetic layer 57.

The free magnetic layer 61 is formed to satisfy the relation $M_2 \cdot t_2 > M_1 \cdot t_1$ between the magnetic thicknesses of the first and second free magnetic layers 60 and 58.

Also, the first and second free magnetic layers 60 and 58 are antiferromagnetically coupled with each other. Namely, when the magnetization direction of the second free magnetic layer 58 is oriented in the $X_1$ direction by the bias layers 32, the magnetization direction of the first free magnetic layer 60 is oriented in the direction opposite to the $X_1$ direction.

Since the magnetic thicknesses of the first and second free magnetic layers 60 and 58 have the relation $M_2 \cdot t_2 > M_1 \cdot t_1$, magnetization of the second free magnetic layer 58 remains to orient the magnetization direction of the free magnetic layer 61 in the $X_1$ direction. At this time, the effective thickness of the free magnetic layer 61 is represented by $(M_2 \cdot t_2 - M_1 \cdot t_1)$.

In this way, the first and second free magnetic layers 60 and 58 are antiferromagnetically coupled with each other so that the magnetization directions thereof are antiparallel to each other, and the magnetic thicknesses thereof have the relation $M_2 \cdot t_2 > M_1 \cdot t_1$ to bring the first and second free magnetic layers 60 and 58 in a synthetic ferrimagnetic state.

Consequently, the magnetization direction of the free magnetic layer 61 crosses the magnetization direction of the pinned magnetic layer 71.

In the spin valve thin film magnetic element 4, when the magnetization direction of the free magnetic layer 61, which is oriented in the $X_1$ direction, is changed by a leakage magnetic field from a recording medium such as a hard disk or the like, the electric resistance changes with the relation to magnetization of the pinned magnetic layer 61, which is pinned in the Y direction, so that the leakage magnetic field from the recording medium is detected by a voltage change based on the change in the electric resistance value.

Since the magnetic thicknesses of the first and second free magnetic layer 60 and 58 have the relation $M_2 \cdot t_2 > M_1 \cdot t_1$, the spin flopping field of the free magnetic layer 61 can be increased. Therefore, the range of magnetic fields in which the free magnetic layer 61 is maintained in the ferrimagnetic state can be widened to stably maintain the free magnetic layer 61 in the ferrimagnetic state.

Even when the second free magnetic layer 58 comprises the anti-diffusion layer 56, the magnetic effective thickness $(M_2 \cdot t_2 - M_1 \cdot t_1)$ of the free magnetic layer 61 can be decreased by appropriately controlling the magnetic thicknesses of $M_1 \cdot t_1$ and $M_2 \cdot t_2$ of the first and second free magnetic layers 60 and 58, respectively. Therefore, the magnetization direction of the free magnetic layer 61 can easily be changed even by an external magnetic field of small magnitude, increasing the sensitivity of the spin valve thin film magnetic element 4.

In addition, the pinned magnetic layer 71 comprises the nonmagnetic layer 73, and the first and second pinned magnetic layers 72 and 74, the first and second pinned magnetic layers 72 and 74 being antiferromagnetically coupled with each other to create the relation that the magnetic moments of both layers cancel each other. However, the thickness of the first pinned magnetic layer 72 is slightly larger than the other, and consequently the spontaneous magnetization resulting from the first pinned magnetic layer 72 slightly remains to bring the pinned magnetic layer 71 into the ferrimagnetic state. The spontaneous magnetization is further amplified by the exchange coupling magnetic field with the antiferromagnetic layer 53 to strongly pin the magnetization direction of the pinned magnetic layer 71 in the Y direction, thereby improving the stability of the spin valve thin film magnetic element 4.

The spin valve thin film magnetic element 4 is manufactured by the same method as the above-described spin valve thin film magnetic element 1 of the first embodiment except that the base layer 12, the first free magnetic layer 60, the nonmagnetic intermediate layer 59, the second free magnetic layer 58, the nonmagnetic conductive layer 15, the second pinned magnetic layer 74, the nonmagnetic layer 73, the first pinned magnetic layer 72, the antiferromagnetic layer 53, and the protecting layer 20 are laminated in turn to form the multilayered product.

EXPERIMENTAL EXAMPLE 1

A base layer comprising a Ta film having a thickness of 30 Å was formed, by using a sputtering apparatus, on a Si substrate on which a lower gap layer made of alumina was provided, and an antiferromagnetic layer comprising a PtMn (Pt; 50 (atomic %), Mn; 50 (atomic %)) film having a thickness of 150 Å was further formed. A pinned magnetic layer having a thickness of 53 Å was formed on the antiferromagnetic layer, a nonmagnetic conductive layer comprising a Cu film having a thickness of 30 Å was formed on the pinned magnetic layer, and a free magnetic layer was formed on the nonmagnetic conductive layer. Furthermore, a protecting layer made of Ta having a thickness of 30 Å was formed, and an upper gap layer made of alumina was formed on the protecting layer to form a lamination.

The free magnetic layer was formed by forming an anti-diffusion layer of Co having a thickness of 5 Å on the nonmagnetic conductive layer, forming a ferromagnetic layer comprising a NiFe alloy having a thickness of 20 or 35 Å on the anti-diffusion layer, forming a nonmagnetic intermediate layer of Ru having a thickness of 8 Å on the ferromagnetic layer, and forming a first free magnetic layer comprising a NiFe alloy having a thickness of 5 to 60 Å on the nonmagnetic intermediate layer. A second free magnetic layer comprised the anti-diffusion layer and the ferromagnetic layer.

The pinned magnetic layer was formed by forming a first pinned magnetic layer of Co having a thickness of 20 Å on the antiferromagnetic layer, forming a nonmagnetic layer of Ru having a thickness of 8 Å on the first pinned magnetic layer, and forming a second pinned magnetic layer having a thickness of 25 Å on the nonmagnetic layer.

The thus-formed lamination was heat-treated at 250° C. for 240 minutes in a magnetic field of 10 kOe to order the antiferromagnetic layer and pin the magnetization direction of the pinned magnetic layer.

In this way, spin valve thin film magnetic elements of Test Examples 1 to 16 shown in Table 1 were produced.

In Table 1, $(t_2-t_1)$ represents the difference between the thickness $(t_2)$ of the second free magnetic layer, and the thickness $(t_1)$ of the first free magnetic layer, and $(t_1+t_2)$ represents the total of the thicknesses $(t_1, t_2)$ of the first and second free magnetic layers.

Each of the spin valve thin film magnetic elements has the structure (Si substrate/$Al_2O_3$ layer/30 Å Ta layer/150 Å PtMn layer/20 Å CoFe layer/8 Å Ru layer/25 Å Co layer/30 Å Cu layer/5 Å Co layer/20–35 Å NiFe layer/8 Å Ru layer/5–60 Å NeFe layer/30 Å Ta layer/$Al_2O_3$ layer).

TABLE 1

| Test Example | Thickness of anti-diffusion layer (Å) | Thickness of ferromagnetic layer (Å) | Thickness of second free magnetic layer, t2 (Å) | Thickness of first free magnetic layer, t1 (Å) | t2 − t1 (Å) | t2 + t1 (Å) | Rate of change in resistance ΔMR (%) | Spin flopping field, Hsf (Oe) |
|---|---|---|---|---|---|---|---|---|
| 1 | 5 | 35 | 40 | 5 | 35 | 45 | 6.54 | >2400 |
| 2 | 5 | 35 | 40 | 10 | 30 | 50 | 6.65 | >2400 |
| 3 | 5 | 35 | 40 | 15 | 25 | 55 | 6.52 | >2400 |
| 4 | 5 | 35 | 40 | 20 | 20 | 60 | 6.32 | 1200 |
| 5 | 5 | 35 | 40 | 25 | 15 | 65 | 6.2 | 680 |
| 6 | 5 | 35 | 40 | 30 | 10 | 70 | 6.05 | 420 |
| 7 | 5 | 20 | 25 | 5 | 20 | 30 | 6.55 | >2400 |
| 8 | 5 | 20 | 25 | 10 | 15 | 35 | 6.5 | >2400 |
| 9 | 5 | 20 | 25 | 15 | 10 | 40 | 6.39 | >2400 |
| 10 | 5 | 20 | 25 | 20 | 5 | 45 | 6.24 | 1040 |
| 11 | 5 | 20 | 25 | 25 | 0 | 50 | 6.1 | 400 |
| 12 | 5 | 20 | 25 | 30 | −5 | 55 | 5.75 | 160 |
| 13 | 5 | 20 | 25 | 35 | −10 | 60 | 3.3 | — |
| 14 | 5 | 20 | 25 | 40 | −15 | 65 | 3.1 | — |
| 15 | 5 | 20 | 25 | 50 | −25 | 75 | 4.94 | 120 |
| 16 | 5 | 20 | 25 | 60 | −35 | 85 | 4.59 | 160 |

Figure 16:
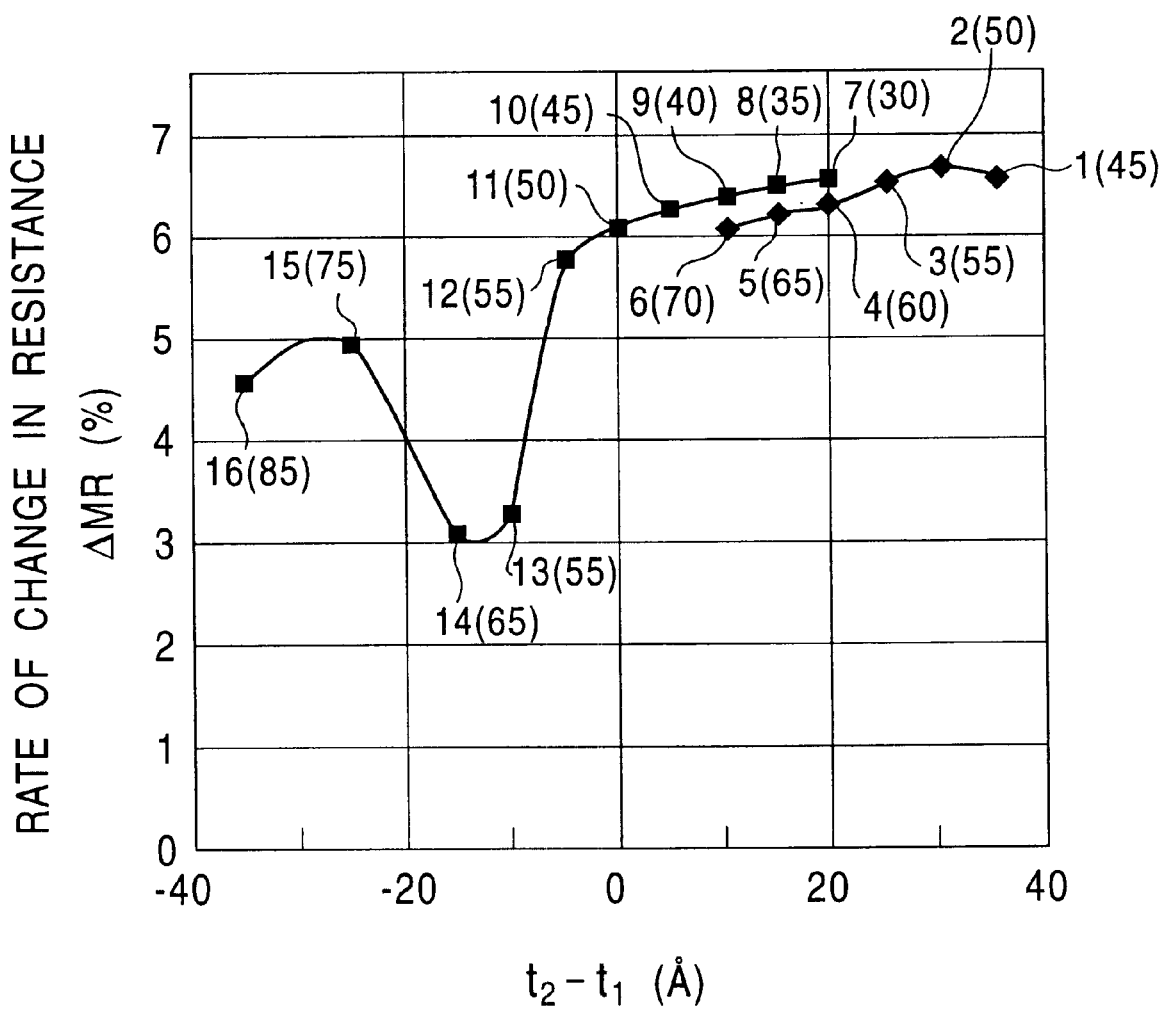
FIG. 16 is a graph showing the relation between the rate of change in resistance (ΔMR (%)), and the difference ($t_2-t_1$) between the thickness ($t_2$) of a second free magnetic layer and the thickness ($t_1$) of a first free magnetic layer of a spin valve thin film magnetic element.
Figure 17:
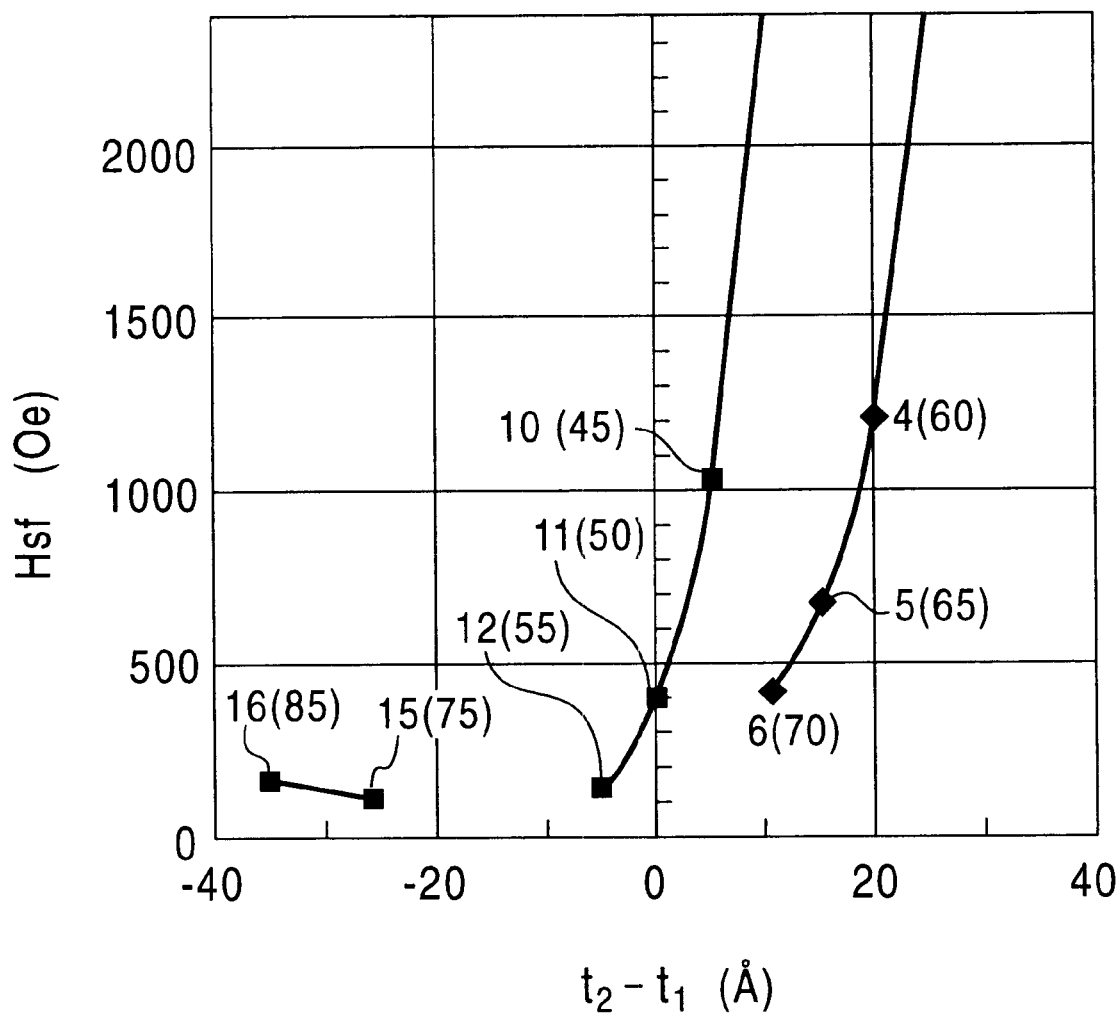
FIG. 17 is a graph showing the relation between the spin flopping field (Hsf (Oe)) of a free magnetic layer, and the difference ($t_2-t_1$) between the thickness ($t_2$) of a second free magnetic layer and the thickness ($t_1$) of a first free magnetic layer of a spin valve thin film magnetic element.

The rates of change in resistance of the spin valve thin film magnetic elements of Test Examples 1 to 16 were measured. The results are shown in FIG. 16 and Table 1. Also, the spin flopping fields of the free magnetic layers were measured. The results are shown in FIG. 17 and Table 1.

FIG. 16 shows the relation between the rate of change in resistance and the difference $(t_2-t_1)$ between the thickness $(t_2)$ of the second free magnetic layer and the thickness $(t_1)$ of the first free magnetic layer of a spin valve thin film magnetic element. In FIG. 16, numerals at plots denote the numbers of the test examples, and each numeral in parentheses denotes the total thickness $(t_2+t_1)$ of the first and second free magnetic layers.

In this figure, the ferromagnetic layers having a thickness of 35 Å are marked with ♦, and the ferromagnetic layers having a thickness of 20 Å are marked with ■.

FIG. 16 indicates that with a thickness difference $(t_2-t_1)$ of over zero, i.e., with the second free magnetic layer having a thickness larger than that of the first free magnetic layer, the rate of change in resistance is 6% or more, and a high rate of change in resistance is thus exhibited.

There is also the tendency that the rate of change in resistance decreases as the total thickness ($t_2+t_1$) of the first and second free magnetic layers increases. This is possibly due to the fact that the shunt (shunt loss) of the sensing current increases as the thickness of the entire free magnetic layer increases to decrease the rate of change in resistance.

In FIG. 16, the plots marked with ■ show a minimum value, i.e., a significant decrease in the rate of change in resistance, near the thickness difference ($t_2-t_1$) of −13 to −14 Å. The minimum value of the rate of change in resistance is possibly due to the fact that the magnetic thickness $M_1 t_1$ of the first free magnetic layer is equal to the magnetic thickness $M_2 t_2$ of the second free magnetic layer.

Therefore, FIG. 16 reveals that the spin valve thin film magnetic element of each of Test Examples 1 to 12, in which the relation $M_2 t_2 - M_1 t_1 > 0$ is established, exhibits a high rate of change in resistance, as compared with the spin valve thin film magnetic elements of Test Examples 13 to 16 in which the relation $M_2 t_2 - M_1 t_1 \leq 0$ is established.

FIG. 17 shows the relation between the spin flopping field (Hsf (Oe)) of the free magnetic layer, and the difference ($t_2-t_1$) between the thickness ($t_2$) of the second free magnetic layer and the thickness ($t_1$) of the first free magnetic layer of a spin valve thin film magnetic element.

In this figure, numerals at plots denote the numbers of the test examples.

FIG. 17 indicates that with a thickness difference ($t_2-t_1$) of 0 or more, i.e., with the second free magnetic layer having a thickness larger than that of the first free magnetic layer, the spin flopping field is significantly increased to 400 Oe or more.

For example, with a bias magnetic field of about 300 Oe supplied from the bias layers, the spin flopping field can be increased to a level higher than the bias magnetic field when the thickness of the second free magnetic layer is set to be larger than that of the first free magnetic layer. With the spin flopping field lower than the bias magnetic field, a portion where the first and second free magnetic layers are not antiparallel to each other occurs in the element, causing asymmetry of the reproducing track profile and a decrease in output.

Although the bias magnetic field supplied from the bias layers depends upon the material and size of the bias layers, the spin flopping field sufficiently higher than the bias magnetic field is preferably obtained by controlling the magnetic thicknesses $M_1 t_1$ and $M_2 t_2$ of first and second magnetic layers.

Therefore, where the thickness of the second free magnetic layer is larger than the thickness of the first free magnetic layer, the first and second free magnetic layers are antiferromagnetically coupled with each other to stably maintain the ferrimagnetic state.

EXPERIMENTAL EXAMPLE 2

A base layer comprising a Ta film having a thickness of 30 Å was formed, by using a sputtering apparatus, on a Si substrate on which a lower gap layer made of alumina was provided, and an antiferromagnetic layer comprising a PtMn (Pt; 50 (atomic %), Mn; 50 (atomic %)) film having a thickness of 150 Å was further formed. A pinned magnetic layer having a thickness of 53 Å was formed on the antiferromagnetic layer, a nonmagnetic conductive layer comprising a Cu film having a thickness of 26 Å was formed on the pinned magnetic layer, and a free magnetic layer was formed on the nonmagnetic conductive layer. Furthermore, a protecting layer made of Ta having a thickness of 30 Å was formed, and an upper gap layer made of alumina was formed on the protecting layer to form a lamination.

The free magnetic layer was formed by forming an anti-diffusion layer of Co having a thickness of 5 Å on the nonmagnetic conductive layer, forming a ferromagnetic layer comprising a NiFe alloy having a thickness of 15 or 50 Å on the anti-diffusion layer, forming a nonmagnetic intermediate layer of Ru having a thickness of 8 Å on the ferromagnetic layer, and forming a first free magnetic layer comprising a NiFe alloy having a thickness of 20 Å on the nonmagnetic intermediate layer. A second free magnetic layer comprised the anti-diffusion layer and the ferromagnetic layer.

The pinned magnetic layer was formed by forming a first pinned magnetic layer of a Co alloy having a thickness of 20 Å on the antiferromagnetic layer, forming a nonmagnetic layer of Ru having a thickness of 8 Å on the first pinned magnetic layer, and forming a second pinned magnetic layer having a thickness of 25 Å on the nonmagnetic layer.

The thus-formed lamination was heat-treated at 250° C. for 220 minutes in a magnetic field of 10 kOe to order the antiferromagnetic layer and pin the magnetization direction of the pinned magnetic layer.

In this way, spin valve thin film magnetic elements of Test Examples 17 to 23 shown in Table 2 were produced.

Each of the spin valve thin film magnetic elements has the structure (Si substrate/$Al_2O_3$ layer/30 Å Ta layer/150 Å PtMn layer/20 Å Co layer/8 Å Ru layer/25 Å Co layer/26 Å Cu layer/5 Å Co layer/15–50 Å NiFe layer/8 Å Ru layer/20 Å NeFe layer/30 Å Ta layer/$Al_2O_3$ layer).

TABLE 2

| Test Example | Thickness of anti-diffusion layer (Å) | Thickness of ferromagnetic layer (Å) | Thickness of second free magnetic layer, $t_2$ (Å) | Rate of change in resistance ΔMR (%) |
|---|---|---|---|---|
| 17 | 5 | 20 | 25 | 7.09 |
| 18 | 5 | 25 | 30 | 7.24 |
| 19 | 5 | 30 | 35 | 7.25 |
| 20 | 5 | 35 | 40 | 7.11 |
| 21 | 5 | 40 | 45 | 7.08 |
| 22 | 5 | 15 | 20 | 6.10 |
| 23 | 5 | 50 | 55 | 6.40 |

The rates of change in resistance of the spin valve thin film magnetic elements of Test Examples 17 to 23 were measured. The results are shown in FIG. 18 and Table 2.

Figure 18:
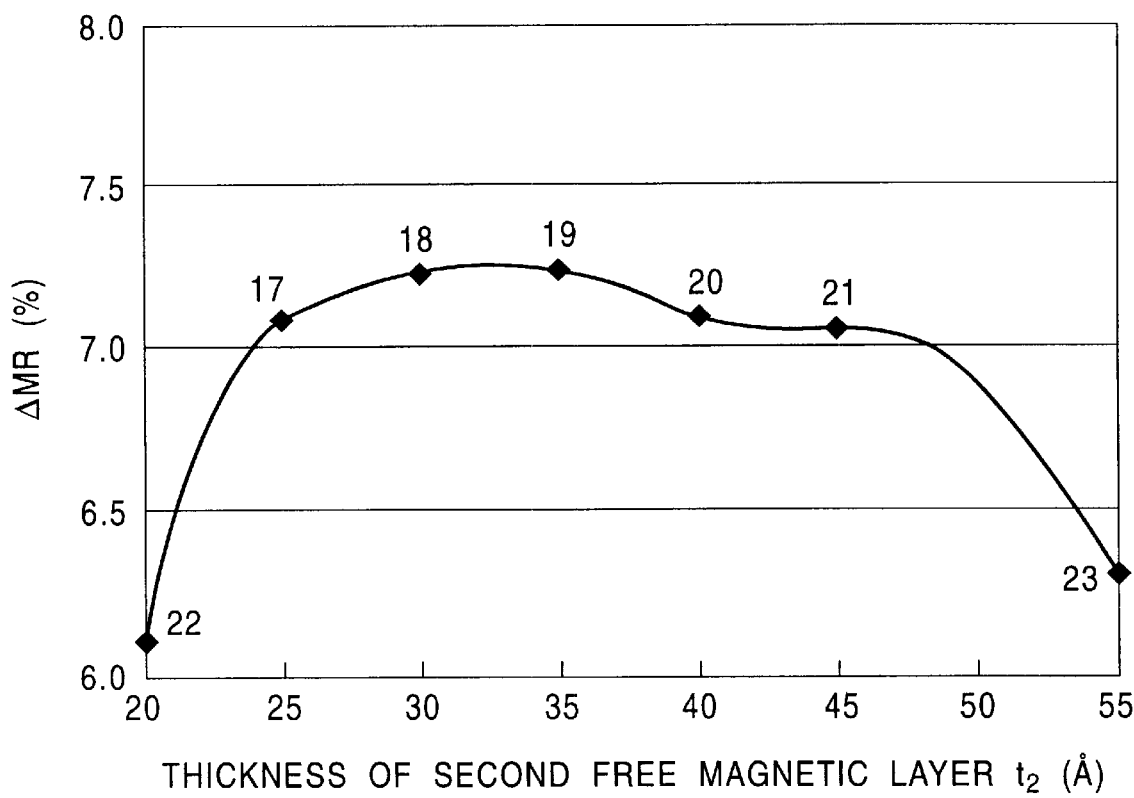
FIG. 18 is a graph showing the relation between the rate of change in resistance (ΔMR (%)), and the thickness ($t_2$) of a second free magnetic layer of a spin valve thin film magnetic element.
Figure 19:
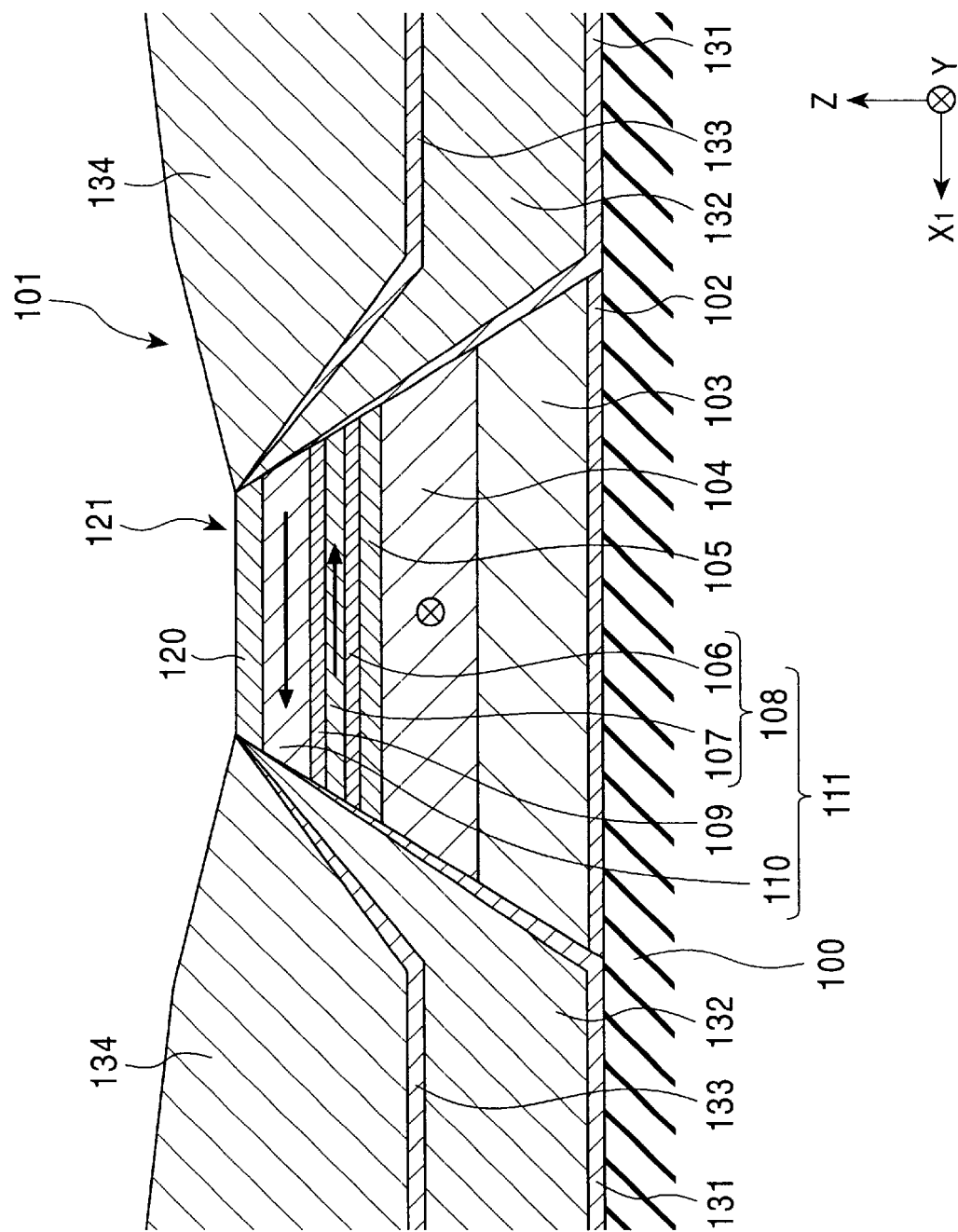
FIG. 19 is a schematic sectional view of a conventional spin valve thin film magnetic element, as viewed from the magnetic recording medium side.
Figure 20:
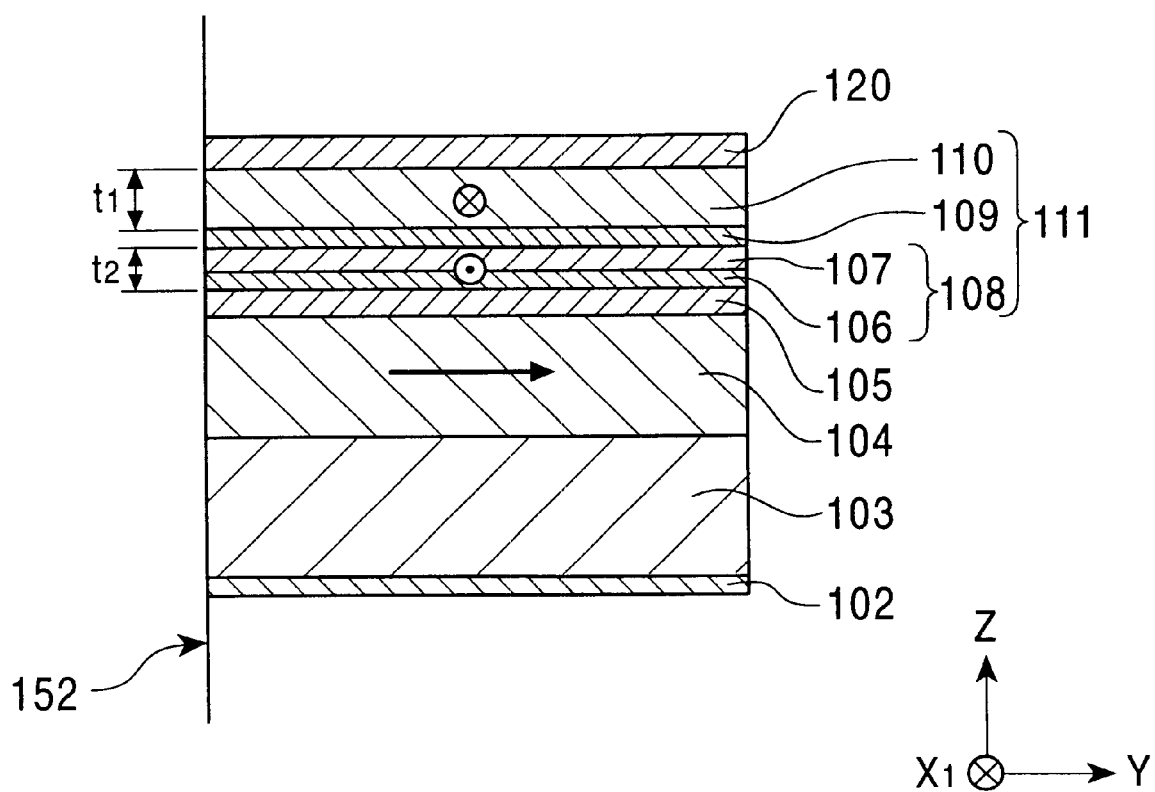
FIG. 20 is a schematic sectional view of a conventional spin valve thin film magnetic element, as viewed from the track width direction.

FIG. 18 shows the relation between the rate of change in resistance (ΔMR (%)) and the thickness ($t_2$) of the second free magnetic layer of a spin valve thin film magnetic element. In FIG. 18, numerals at plots denote the numbers of the test examples.

FIG. 18 indicates that with the second free magnetic layer having a thickness ($t_2$) of 25 to 45 Å, particularly in the range of 30 to 35 Å, the rate of change in resistance is 7.2% or more, and a high rate of change in resistance is thus exhibited.

Experimental Examples 1 and 2 indicate that when the thickness of the second free magnetic layer in contact with nonmagnetic conductive layer is larger than the thickness of the first free magnetic layer, the rate of change in resistance and the spin flopping field can be increased.

The rate of change in resistance can also be increased by setting the magnetic thickness $M_2 t_2$ of the second free magnetic layer to be larger than the magnetic thickness $M_1 t_1$ of the first free magnetic layer.

Particularly, with the second free magnetic layer having a thickness of 25 to 45 Å, a high rate of change in resistance can be obtained.

As described above, the spin valve thin film magnetic element of the present invention comprises the antiferromagnetic layer, the pinned magnetic layer formed in contact with the antiferromagnetic layer so that the magnetization direction is pinned by an exchange coupling magnetic field with the antiferromagnetic layer, the nonmagnetic conductive layer in contact with the pinned magnetic layer, and the free magnetic layer in contact with the nonmagnetic conductive layer. The free magnetic layer comprises the first and second free magnetic layers with the nonmagnetic intermediate layer provided therebetween. The magnetization directions of the first and second free magnetic layer are antiparallel to each other, and the first and second free magnetic layers are brought into a ferrimagnetic state. The thickness of the second free magnetic layer provided on the nonmagnetic conductive layer side is larger than the thickness of the first free magnetic layer, and the magnetic thickness of the second free magnetic layer is also larger than the magnetic thickness of the first free magnetic layer. Therefore, the spin flopping field of the free magnetic layer is increased, and thus the antiferromagnetic coupling between the first and second free magnetic layers can be stably maintained to maintain the ferrimagnetic state of the free magnetic layer, thereby increasing the sensitivity of the spin valve thin film magnetic element.

In addition, the effective thickness of the free magnetic layer can be decreased by appropriately controlling the thicknesses of the first and second free magnetic layers so that the magnetization direction of the free magnetic layer can be changed with an external magnetic field of small magnitude, thereby increasing the sensitivity of the spin valve thin film magnetic element.

Furthermore, the magnetic effective thickness of the free magnetic layer can be decreased while the thickness of the entire free magnetic layer is increased to some extent, thereby increasing the sensitivity of the spin valve thin film magnetic element without significantly decreasing the rate of change in resistance.

In the spin valve thin film magnetic element of the present invention, assuming that saturation magnetization and the thickness of the second free magnetic layer are $M_2$ and $t_2$, respectively, and saturation magnetization and the thickness of the first free magnetic layer are $M_1$ and $t_1$, respectively, $M_2 \cdot t_2 > M_1 \cdot t_1$ is satisfied.

Therefore, the spin flopping field of the free magnetic layer is increased to stably maintain the antiferromagnetic coupling between the first and second free magnetic layers, thereby increasing the rate of change in resistance while maintaining the ferrimagnetic state of the free magnetic layer. Thus, the sensitivity of the spin valve thin film magnetic element can be increased.

In the spin valve thin film magnetic element of the present invention, the thickness of the second free magnetic layer lies in the range of 25 to 45 Å, and thus the rate of change in resistance of the spin valve thin film magnetic element can be increased.

In the spin valve thin film magnetic element of the present invention, the pinned magnetic layer may comprise first and second pinned magnetic layers with a nonmagnetic layer provided therebetween, wherein the magnetization directions of the first and second pinned magnetic layers are antiparallel to each other, and the first and second pinned magnetic layers are put into a ferrimagnetic state.

Therefore, the spontaneous magnetization of the whole pinned magnetic layer slightly remains, and is further amplified by an exchange coupling magnetic field with the antiferromagnetic layer to strongly pin the magnetization direction of the pinned magnetic layer.

A thin film magnetic head of the present invention comprises the spin valve thin film magnetic element exhibiting a high rate of change in resistance and high sensitivity, and can thus detect an external magnetic field of small magnitude, increasing the reproduced output of the head. Therefore, the thin film magnetic head can be used as a magnetic recording device with high recording density.

In a method of manufacturing the spin valve thin film magnetic element of the present invention, the thickness of the second free magnetic layers of two magnetic layers, which constitute the free magnetic layer, is larger than that of the first free magnetic layer, and the lamination is heat-treated with a magnetic field applied in the track width direction, which is higher than the coercive force of the free magnetic layer and lower than the magnetic field of spin flopping transition of the first and second free magnetic layers, to orient the direction of induced magnetic anisotropy of the first and second free magnetic layers, which is disturbed by the first heat treatment step, in the track width direction. Therefore, the spin valve thin film magnetic element exhibiting less Barkhausen noise of the free magnetic layer, high sensitivity, and a high rate of change in resistance can be obtained.

Furthermore, the method of manufacturing the spin valve thin film magnetic element of the present invention further comprises the heat treatment step of heat-treating the lamination at a temperature lower than the heat treatment temperature of the second heat treatment step with a rotating magnetic field applied, which is higher than the coercive force of the free magnetic layer and lower than the magnetic field of spin flopping transition of the first and second free magnetic layers, after the second heat treatment step. Therefore, the magnetic hysteresis of the free magnetic layer can be decreased to further decrease Barkhausen noise of the free magnetic layer, thereby producing the spin valve thin film magnetic element having high sensitivity.

What is claimed is:

1. A method of manufacturing a spin valve thin film magnetic element comprising:

laminating an antiferromagnetic layer, a pinned magnetic layer, a nonmagnetic conductive layer, and a free magnetic layer comprising first and second free magnetic layers antiferromagnetically coupled with each other with a nonmagnetic intermediate layer provided therebetween to form a lamination;

heat-treating, in a first heat treatment the lamination with a magnetic field applied in a direction perpendicular to a track width direction of the lamination to produce an exchange coupling magnetic field between the antiferromagnetic layer and the pinned magnetic layer such that a magnetization direction of the pinned magnetic layer is pinned in a direction perpendicular to the track width direction;

heat treating, in a second heat treatment, the lamination with a magnetic field applied in the track with width direction, which is higher than a coercive force of the free magnetic layer and lower than a magnetic field of spin flopping transition of the first and second free magnetic layers antiferromagnetically coupled with each other, to orient a direction of induced magnetic anisotropy of the first and second free magnetic layers in the track width direction;

wherein a thickness of the second free magnetic layer provided on the nonmagnetic conductive layer side is larger than that of the first free magnetic layer; and heat treating, in a third heat treatment, the lamination at a temperature lower than the heat treatment temperature of the second heat treatment with a rotating magnetic field applied, which is higher than the coercive force of the free magnetic layer and lower than the magnetic field of spin flopping transition of the first and second free magnetic layers, the third heat treatment being applied after the second heat treatment.

* * * * *